United States Patent
Kayum et al.

(10) Patent No.: US 10,570,706 B2
(45) Date of Patent: Feb. 25, 2020

(54) PARALLEL-PROCESSING OF INVASION PERCOLATION FOR LARGE-SCALE, HIGH-RESOLUTION SIMULATION OF SECONDARY HYDROCARBON MIGRATION

(71) Applicant: Saudi Arabian Oil Company, Dhahran (SA)

(72) Inventors: Suha Naim Kayum, Dhahran (SA); Larry Siu-Kuen Fung, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 9 days.

(21) Appl. No.: 16/007,175

(22) Filed: Jun. 13, 2018

(65) Prior Publication Data

US 2018/0371875 A1 Dec. 27, 2018

Related U.S. Application Data

(60) Provisional application No. 62/524,223, filed on Jun. 23, 2017.

(51) Int. Cl.
*G06G 7/48* (2006.01)
*E21B 41/00* (2006.01)
(Continued)

(52) U.S. Cl.
CPC ........ *E21B 41/0092* (2013.01); *G01V 99/005* (2013.01); *G06F 17/5009* (2013.01);
(Continued)

(58) Field of Classification Search
None
See application file for complete search history.

(56) References Cited

U.S. PATENT DOCUMENTS

| 7,006,959 B1 | 2/2006 | Huh et al. |
| 7,324,929 B2 | 1/2008 | Huh et al. |
(Continued)

FOREIGN PATENT DOCUMENTS

| WO | 2012033650 | 3/2012 |
| WO | 2016187238 | 11/2016 |

OTHER PUBLICATIONS

Romanov, A.G. et al., "3D Modeling of the Hydrocarbon Migration in the Jurassic Petroleum System in Part of the West Siberia Basin"), Jun. 7-9, 2005, 6th Canadian International Petroleum Conference, Petroleum Society. (Year: 2005).*

(Continued)

*Primary Examiner* — Cedric Johnson
(74) *Attorney, Agent, or Firm* — Fish & Richardson P.C.

(57) ABSTRACT

A parallel-processing hydrocarbon (HC) migration and accumulation methodology is applied to basin data to determine migration pathways and traps for high-resolution petroleum system modeling. HC is determined in parallel to have been expelled in source rocks associated with a plurality of grid cells divided into one or more subdomains. Potential trap peaks are identified within the plurality of grid cells. An invasion percolation (IP) process is performed until the HC stops migrating upon arrival to the plurality of trap peaks. A determination is made as to whether the grid cells containing HC contains an excess volume of HC. An accumulation process is performed to model the filling of the HC at a trap associated with the identified potential trap peaks. The trap boundary cell list is updated in parallel together with an HC potential value. Trap filling terminates when excess HC is depleted or a spill point is reached.

17 Claims, 20 Drawing Sheets
(12 of 20 Drawing Sheet(s) Filed in Color)

(51) Int. Cl.
G06F 17/50 (2006.01)
G01V 99/00 (2009.01)
(52) U.S. Cl.
CPC .. *G01V 2210/644* (2013.01); *G01V 2210/661* (2013.01); *G06F 2217/16* (2013.01)

(56) References Cited

U.S. PATENT DOCUMENTS

| | | | |
|---|---|---|---|
| 7,496,488 | B2 | 2/2009 | Jenny et al. |
| 7,596,480 | B2 | 9/2009 | Fung et al. |
| 8,073,663 | B2 | 12/2011 | Carruthers et al. |
| 8,386,227 | B2 | 2/2013 | Fung et al. |
| 8,433,551 | B2 | 4/2013 | Fung et al. |
| 8,589,135 | B2 | 11/2013 | Middya et al. |
| 8,718,993 | B2 | 5/2014 | Klie |
| 8,805,660 | B2 | 8/2014 | Guyaguler et al. |
| 9,068,448 | B2 | 6/2015 | Hui et al. |
| 9,069,102 | B2 | 6/2015 | Fung |
| 9,176,252 | B2 | 11/2015 | Liang et al. |
| 9,177,086 | B2 | 11/2015 | Fung |
| 9,208,268 | B2 | 12/2015 | Fung |
| 9,418,180 | B2 | 8/2016 | Maliassov |
| 2011/0184711 | A1* | 7/2011 | Altman ................. E21B 49/005 703/10 |
| 2011/0264430 | A1* | 10/2011 | Tapscott ................. G01V 99/00 703/10 |
| 2012/0029895 | A1* | 2/2012 | Xi ........................ G01V 99/005 703/10 |
| 2013/0090907 | A1* | 4/2013 | Maliassov ........... G06F 17/5009 703/10 |
| 2013/0218538 | A1 | 8/2013 | Fuecker et al. |
| 2014/0338895 | A1 | 11/2014 | Paulsen |
| 2014/0354193 | A1 | 12/2014 | Nakanishi et al. |
| 2014/0358502 | A1* | 12/2014 | Kleine ..................... E21B 49/00 703/2 |
| 2014/0365193 | A1* | 12/2014 | Biegert .................. G01V 3/081 703/10 |
| 2015/0127313 | A1* | 5/2015 | Lawson ................. G01V 9/007 703/10 |
| 2015/0134314 | A1 | 5/2015 | Lu et al. |
| 2015/0142407 | A1* | 5/2015 | Wakefield ............... E02D 1/027 703/10 |
| 2016/0084081 | A1 | 3/2016 | Lawson et al. |
| 2016/0290107 | A1* | 10/2016 | Cacas-Stentz .......... E21B 43/00 |
| 2016/0298427 | A1 | 10/2016 | Kauerauf et al. |

OTHER PUBLICATIONS

Singh, Varunendra et al., "Reservoir Modeling of CO2 Plume Behavior Calibrated Against Monitoring Data from Sleipner, Norway", Sep. 19-22, 2010, SPE Annual Technical Conference and Exhibition, Society of Petroleum Engineer. (Year: 2010).*
Hantschel, Thomas et al., "Chapter 6: Migration and Accumulation", 2009, Fundamentals of Basin and Petroleum Systems Modeling, Springer-Verlag. (Year: 2009).*
Ismagulova, Saltanat et al. "Petroleum Systems Modeling in Amudarya Basin", Nov. 1-3, 2016, SPE Annual Caspian Technical Conference & Exhibition, Society of Petroleum Engineers. (Year: 2016).*
International Search Report and Written Opinion issued in International Application No. PCT/US2018/038479 dated Sep. 25, 2018, 16 pages.
Berg, "Capillary Pressuresin Stratigraphyic Traps," AAPG Bulletin, vol. 59, No. 6, p. 939-956, Jun. 1975, 18 pages.
Broadbent and Hammersley, "Percolation Processes I. Crystals and Mazes," Proceedings of the Cambridge Philsophical Society vol. 53, No. 3, pp. 629-641, Jul. 1957, 13 pages.
Carruthers, "Transport Modeling of Secondary Oil Migration Using Gradient-Driven Invasion Percolation Techniques," Ph.D. Thesis, Heriot-Watt University, 1998, 333 pages.
Chatzis and Dullien, "Modeling Pore Structures by 2-D and 3-D Networks with Application to Sandstones," Canadian Journal of Petroleum Techniques, vol. 16, Issue 1, Jan. 1977, 13 pages.
Frisch and Hammersley, "Percolation Processes and Related Topics," Journal of the Society for Industrial and Applied Mathematics, vol. 11, No. 4, p. 894-918, Dec. 1963, 25 pages.
Hantschel and Kauerauf, "Chapter 6: Fundamentals of Basin and Petroleum Systems Modeling," Springer Verlag, 2009, 35 pages.
Larson et al., "Percolation Theory of Two Phase Flow in Porous Media," Chemical Engineering Science, vol. 36, No. 1, Dec. 1981, 17 pages.
Magoon and Dow, "The Petroleum System: From Source to Trap," AAPG Memoir vol. 60, Jan. 1994, 22 pages.
Masson and Blanco, "A fast two-step algorithm for invasion percolation with trapping," Computers and Geosciences, Pergamon Press, vol. 90, Feb. 27, 2016, 12 pages.
Masson et al., "A Fast Algorithm for Invasion Percolation," Transport in Porous Media, Reidel, Dordrecht, vol. 102, No. 2, Feb. 4, 2014, 8 pages.
Meakin, "Invasion Percolation of Substrates with Correlated Disorder," Physica A: Statistical Mechanics and its Application, vol. 173, Issue 3, p. 305-324, May 1991, 20 pages.
Nooruddin and Blunt, "Large-scale Invasion Percolation with Trapping for Upscaling Capillary-Controlled Darcy-scale Flow," Transport in Porous Media, Reidel, Dordrecht, vol. 121, No. 2, Nov. 28, 2017, 28 pages.
Oldenberg et al., "On the use of Darcy's Law and Invasion Percolation Approaches for Modeling Large-Scale Geologic Carbon Sequestration," Greenhouse Gases Science and Technology, vol. 6, No. 1, p. 19-33, Dec. 2015, 15 pages.
Pegas-Fiornet et al., "Chapter 13 Comparison between the Different Approaches of Secondary and Tertiary Hydrocarbon Migration Modeling in Basin Simulations," from Basin Modeling: New Horizons in Research and Application, AAPG Hedbert Series 4, 2012, 16 pages.
Pepper and Corvi, "Simple Kinetic Models of Petroleum Formation—Part I: Oil and Gas Generation from Kerogen," Marine and Petroleum Geology, vol. 12, Issue 3, 1995, 29 pages.
Wilkinson and Willemsen, "Invasion Percolation: A New Form of Percolation Theory," Journal of Physics A: Mathematical and General, vol. 16, Issue 14, 1983, 12 pages.

* cited by examiner

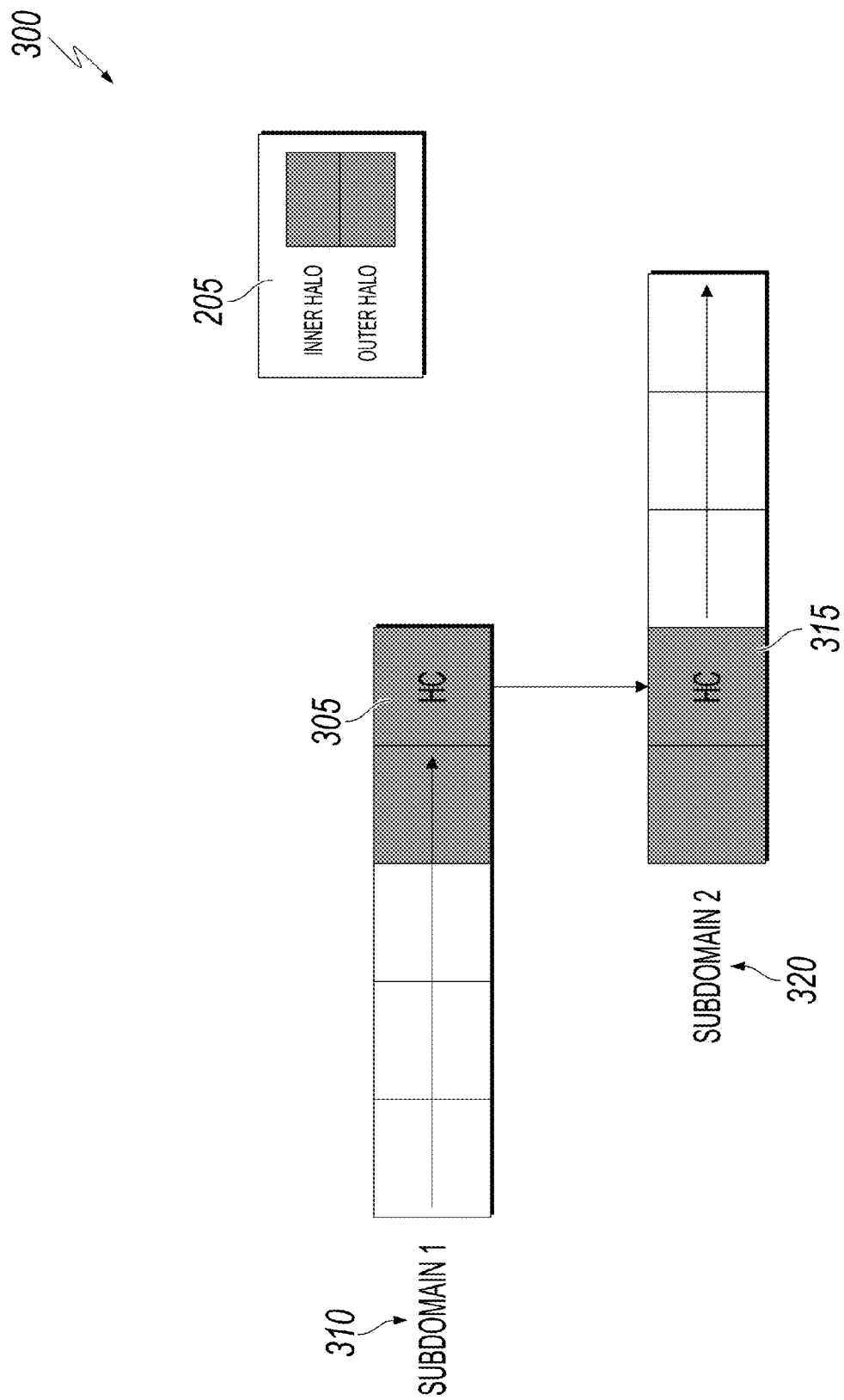

PARALLEL-PROCESSING OF INVASION PERCOLATION FOR LARGE-SCALE, HIGH-RESOLUTION SIMULATION OF SECONDARY HYDROCARBON MIGRATION

CROSS-REFERENCE TO RELATED APPLICATIONS

This application claims the benefit of priority to U.S. Provisional Application, Ser. No. 62/524,223, entitled "PARALLEL-PROCESSING OF INVASION PERCOLATION FOR LARGE-SCALE, HIGH-RESOLUTION SIMULATION OF SECONDARY HYDROCARBON MIGRATION", filed on Jun. 23, 2017, the entire contents of which is hereby incorporated by reference.

BACKGROUND

Basin modeling/simulation, also known as petroleum system modeling/simulation, tracks the evolution of a sedimentary basin and its fluid content over geologic time scales of hundreds of millions of years by digitizing basin models and simulating interrelated processes associated with a basin. In recent years, it has become an important tool for the exploration geoscientists to predict types and presence of hydrocarbon (HC) fluids and to assess geologic risk before drilling exploratory wells to retrieve the HC fluids. A basin simulator often includes numerical modules to compute: 1) back-stripping and compaction; 2) pressure calculation; 3) heat flow analysis and kinetics; 4) petroleum generation, adsorption, and expulsion; 5) HC fluid phase behavior; and 6) HC migration and entrapments. Recently, invasion percolation (IP) has become a popular method to model secondary HC migration. Current commercial releases of basin modeling software have an IP method implemented only for serial computation, which is sufficiently fast for basin models up to a threshold of a few million cells. However, this threshold is an undesirable limitation for large-scale basin simulations where a fine-grid modeling of HC migration is desired.

SUMMARY

The present disclosure describes a parallel-processing invasion percolation (IP) migration method for a two-phase oil-water system that is targeted for distributed-memory, high-performance computing (HPC) clusters.

In an implementation, hydrocarbons (HCs) are determined to have been expelled in source rocks associated with a plurality of grid cells divided into one or more subdomains. Potential trap peaks are identified within the plurality of grid cells. An invasion process is performed until the HC stops migrating within the plurality of grid cells. A determination is made whether grid cells containing HCs contain an excess volume of HCs. An accumulation process is performed to model filling of grid cells with the HC at a trap associated with the identified potential trap peaks. The trap is updated with an HC potential value.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, commercially-available, conventional basin simulators are configured to perform serial processing using an IP methodology. Conventional basin simulator configurations constrain data model sizes and resultant output resolution due to required computational resources required to perform basin simulations. Second, the described methodology is configured for distributed-memory, HPC clusters. As a result, data model size and output resolution is not limited as in the conventional basin simulators. Third, the described methodology and use of HPC clusters provides enhanced computational performance and scalability. Ultra-large basin simulations can be run in a much shorter time-period than that required by conventional basin simulators or other methods and provides geoscientists and engineers with a capability to perform high-resolution migration simulation for basin modeling.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

The patent or application file contains at least one color drawing executed in color. Copies of this patent application publication with color drawings(s) will be provided by the Patent and Trademark Office upon request and payment of the necessary fee.

FIG. 3 is a block diagram illustrating hydrocarbon (HC) exchange during a flow routine, according to an implementation.

Like reference numbers and designations in the various drawings indicate like elements.

DETAILED DESCRIPTION

Figure 1A:
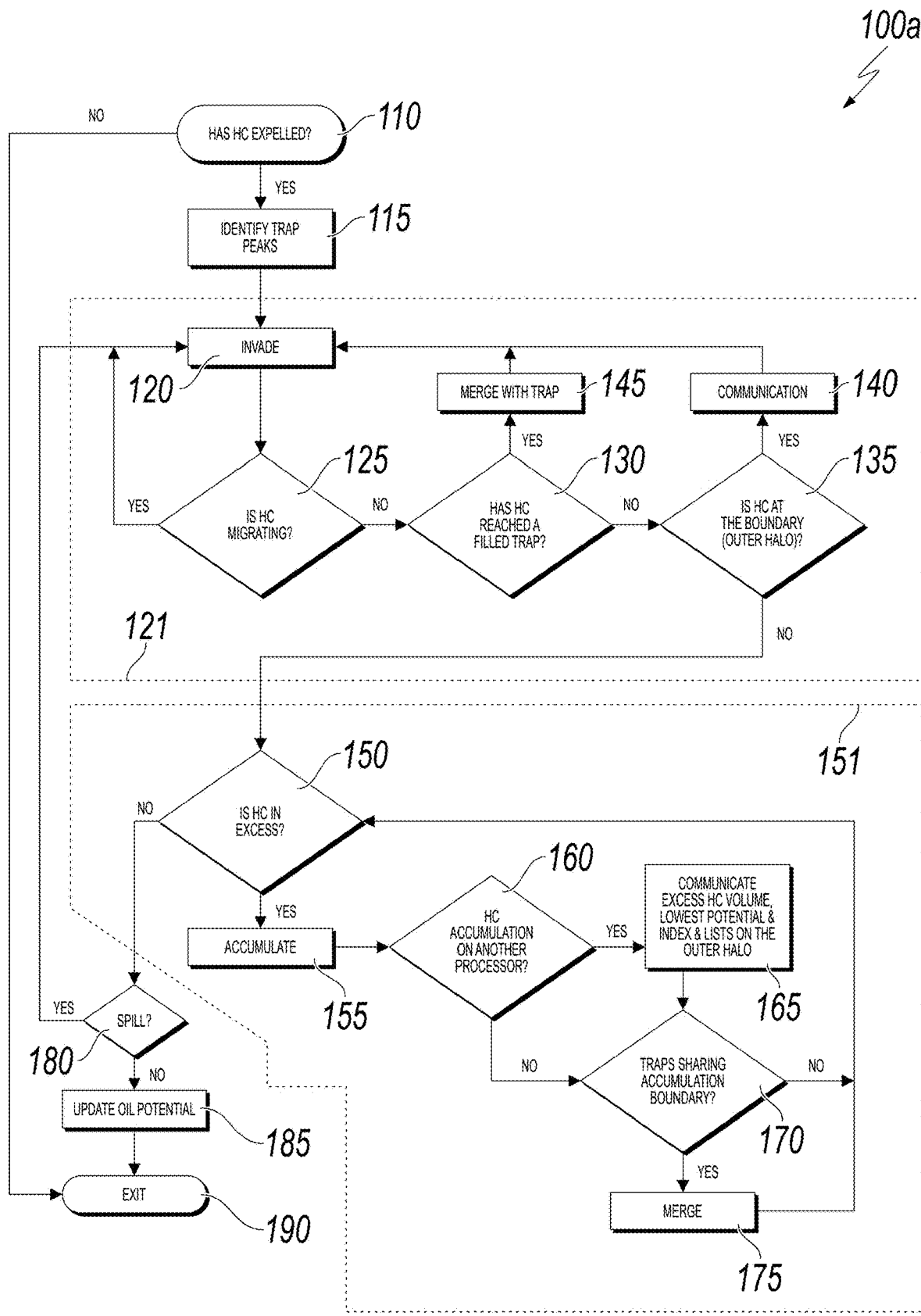
FIG. 1A is a flowchart illustrating a parallel-processing invasion percolation (IP) migration method for a two-phase oil-water system that is targeted for distributed-memory, high-performance computing (HPC) clusters, according to an implementation.

The following detailed description describes a parallel-processing invasion percolation (IP) migration method for a two-phase oil-water system that is targeted for distributed-memory, high-performance computing (HPC) clusters, and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications, without departing from scope of the disclosure. The present disclosure is not intended to be limited to the described or illustrated implementations, but to be accorded the widest scope consistent with the described principles and features.

A petroleum system/basin is a geologic system that consists of geologic elements and processes required for a hydrocarbon (HC) accumulations to exist. The geologic elements typically include a source rock, a reservoir rock, a seal rock, and an overburden rock. The processes required for HC accumulations include formation of traps as well as consecutive generation, expulsion, migration, and accumulation of HCs.

Basin modeling/simulation, also known as petroleum system modeling/simulation, tracks the evolution of a sedimentary basin and its fluid content over geologic time scales of hundreds of millions of years by digitizing basin models and simulating interrelated processes associated with a basin. In recent years, it has become an important tool for the exploration geoscientists to predict types and presence of HC fluids and to assess a geologic risk before drilling exploratory wells to retrieve the HC fluids. A basin simulator often includes numerical modules to compute: 1) backstripping and compaction; 2) pressure calculation; 3) heat flow analysis and kinetics; 4) petroleum generation, adsorption, and expulsion; 5) HC fluid phase behavior; and 6) HC migration and entrapments. Recently, IP has become a popular method to model secondary HC migration.

Traditional basin simulation applies a multiphase flow extension of Darcy's law. Computational requirements to simulate, in sufficient detail, HC migration of three-dimensional (3D), ultra-large scale basin models using Darcy's law is typically beyond typical computer hardware resources accessible by HC exploration and producing companies, consuming a significant fraction of computer processing time. Simulating HC migration, using a rule-based IP method, is a less computationally challenging method, and enables secondary HC migration simulation to be performed at a greater-resolution than that of conventional practice. Current commercial releases of basin modeling software have a serial computation configuration used to perform the rule-based IP method serially. Serial methods are typically used for basin models up to a threshold of a few million cells, but this threshold is an undesirable limitation for larger-scale basin simulations where a fine-grid modeling of HC migration is desired to permit greater-resolution results.

Percolation theory describes flow phenomena in porous mediums under the effect of capillary forces at a constant applied pressure. The connection between the percolation theory and the displacement of one fluid by another in a porous medium under the action of capillary forces has been studied. The term IP relates to displacement of a fluid by another at a constant flow rate instead of at a constant pressure. In addition, advancement of an interface to a point of least resistance had been introduced as opposed to the advancement of the interface to a chosen threshold resistance. The differences led to the described IP method.

In the new IP method, the medium is characterized as a network of sites and bonds. In simulation, this characterization is translated to grid cells and grid cell connections with neighboring grid cells. The new IP method assumes that all the sites of a network are filled with a resident (defending) fluid. The invading fluid, which is introduced into the system, displaces the defending fluid. Capillary forces play the biggest role in how the HC migrates within a system. Migration is promoted by buoyancy forces and inhibited by the capillary pressure between the invading fluid and the resident fluid. HC fluids (for example, oil) must overcome the capillary pressure to flow from a rock pore through an adjacent pore throat.

For the purposes of this disclosure, the following list associates symbols with meanings:

| | |
|---|---|
| g | Gravitational constant, |
| $p_{ce}$ | Capillary entrance pressure, |
| $p_{cow}$ | Oil-water capillary pressure, |
| $p_o$ | Oil pressure, |
| $p_w$ | Water pressure, |
| $P_B$ | Buoyancy pressure, |
| $S_{co}$ | Critical oil saturation, |
| $S_{wc}$ | Connate water saturation, |
| V | Volume, |
| z | Depth from datum, |
| $\Phi_o$ | Oil potential, |
| $\Phi_w$ | Water potential, |
| $\rho_o$ | Oil density, |
| $\rho_w$ | Water density, and |
| $\phi$ | Porosity. |

To the extent there is a conflict between symbols in the previous list and ordinary meaning, the associated meaning in the previous list is to be considered controlling. To the extent that a meaning of a symbol is still not clear, the meaning of the symbol as understood by one of ordinary skill in the art is assumed.

At a high-level, a new, non-standard, non-typical, parallel-processing IP method with a moving front accelerates HC migration in a basin simulation and allows use of much larger and greater-resolution models. The new IP method performs distributed-memory, parallel-processing of both HC migration and accumulation. A basin domain is partitioned by the new IP method into several computational subdomains, each subdomain requiring a roughly balanced workload compared to the other subdomains. Each of the subdomains is assigned to a computing core of an assigned work group of central processing units (CPUs) (in one or multiple computing nodes) in a HPC cluster. Note that each computing node in a HPC cluster contains one or more CPUs/processors. Each processor contains one or more computing cores.

Distributed HC migrates in parallel from source to traps across computing processes. After migration, the accumulation process takes place where a trap grows dynamically and can cross several subdomains and result in mergers. Accumulation stops when a spill or breakthrough is reached or when excess HC volume has been exhausted. Migration and accumulating processing alternates until steady state is reached. Additionally, the new IP method minimizes inter-process communication, resulting in excellent scalability. Serial IP methods are limited by memory storage available on a computing node and the run time required to process migration and accumulation serially. The new IP method can use more computing nodes to distribute the storage requirement of a model, and can speed up processing using simultaneous processing of multiple tips residing on separate computing processes and in the interleaving of the migration step and the accumulation step. Spills and breakthroughs are also managed, after which tertiary migration may take place. All the components of migration are parallelized that would use an IP methodology. The described new IP method is general and applicable to any type of potential field.

A basin model may contain various types of complexities and rock types. The method handles complexity resulting from distributing a petroleum system across multiple subdomains and the communication between non-neighboring subdomains that is needed during the accumulation stage. In addition, the method handles the communication needed when a merger occurs between two traps or when a migrating stringer merges with a trap containing accumulated oil. This communication could also entail communicating between non-neighboring subdomains as the migration stringer could enter a trap on one subdomain but the breakthrough or spill point of that same trap could reside on a different subdomain.

Migration models movement of expelled HC fluids (for example, oil) from source rocks to traps or accumulations (which takes place at trap boundaries). During migration, the expelled HC fluids can move through carrier rock. A basin model may contain multiple source rocks, where each source rock may have any number of source points and may spread across several subdomains. The source could reside on one subdomain and the trap on another subdomain.

Migration pathways may cross multiple subdomains to connect with a remote accumulating trap. In the process of backfilling, a trap may grow to span multiple subdomains. Multiple accumulating traps may merge to form larger traps while spillage and breakthrough are modeled accurately to correctly predict trap locations and volume of accumulations. The accumulation process stops when a spill or a breakthrough occurs or when excess HC fluid volume has been exhausted. All of the processes may span multiple subdomains and may involve various forms of inter-process communication (for example, send or receive) or collective processes (for example, gathering results from multiple processes rather than a root process) to achieve an end result.

In typical implementations, the method possesses a unique, parallel-distributed data system and associated methods to manage trap accumulation, merger, spills and breakthrough. The data system includes a trap array, where each trap is uniquely identified. Traps in the petroleum system are deduced and a global cell number of the trap peak is used as an identifier. The traps are inactive until HC migrates into them. In this way, stored data is such that if a trap resides on a subdomain, only indices residing on that subdomain pertaining to the trap would be stored in a boundary list. The global cell index of the peak of the trap is used to distinguish which lists belong to which trap. When an accumulating trap grows and its boundary enters into a subdomain's outer halo, the list is split and indices on the outer halo are mapped to their corresponding inner halo values and sent to the subdomain where the indices of those cells actually reside. In addition, to determine the indices of the cells with the least resistance to invasion, corresponding potential values of the indices are also saved in an array. To globally keep track of all the active traps and to reference the correct lists as the accumulation process is taking place, an active trap array is configured with the necessary information. HC has a moving front (or border) between different fluids in a reservoir (such as, a water flood and HCs). For example, with respect to water and HC, the front traverses through a geological formation as more water is pushed in and HCs are extracted). In the disclosure, a front can be referred to as an invasion and accumulation tip. The invasion tip of the particular trap is always maintained in the active trap array. When mergers between two traps occur, the trap peak global values are also merged in the active trap array.

Additionally, in typical implementations, invasion processing and accumulation processing are considered to be separate, and the method alternates between these two main processes. The invasion process contains a driver which encompasses the invasion main routine, where the HC migrates from a greater-potential site to a lesser-potential site following a path of least resistance locally until the HC reaches an outer halo of the subdomain. The invasion driver routine then handles the communication which would take place from the outer halo of this subdomain to the inner halo of the adjacent subdomain. Once communication is complete, the invasion routine continues in that subdomain as long as the HC can move from the new invasion tip to a lesser potential neighboring cell. The invasion process alternates between the communication and flow routines until no more HC flow takes place. At this stage, all the HC from the source points has migrated to the trap peaks. Once the invasion process is complete, the method enters the accumulation stage, where, again, an accumulation driver handles necessary communication and an accumulation routine handles local accumulation. The accumulation process continues to alternate between backfilling HC locally and communicating when HC or the boundary list reaches the outer halo. Once a spill or breakthrough occurs, a corresponding trap accumulation process is halted and the process continues to backfill HC in other traps until no more accumulation can take place. The accumulation process then exits and if there is HC in the spill or breakthrough phase, then the method enters the invasion process again and HC begins migrating. The method interleaves between these two main processes until the HC is distributed evenly in the petroleum system.

A message passing interface (MPI) standard is used to implement the parallel-processing method targeting distributed-memory HPC clusters. The described methodology and use of HPC clusters provides enhanced computational performance and scalability. Ultra-large basin simulations can be run in a much shorter time-period than that required by conventional or other methods and provides geoscientists and engineers with a capability to perform high-resolution migration simulation for basin modeling.

The disclosure explains the new IP method, followed by a step-by-step explanation of numerical components of the new parallel-processing implementation of the new IP method. As previously-stated, the implementation is for a two-phase, oil-water system, which can simulate migration of HC fluids expelled from multiple sources in one layer or multiple layers. The implementation is further explained using numerical examples, including a 1.4 billion cell basin model, where correctness and scalability of the parallel-processing new IP method implementation is validated.

New IP Method

When applying IP to secondary HC migration, a grid cell's defending fluid is considered to be a wetting fluid (for example, water), which is displaced by an invading non-wetting fluid (for example, oil). Capillary entrance pressure, $P_{ce}$, also known as capillary threshold pressure, for the non-wetting phase (oil), with respect to the wetting phase (water), is the capillary pressure value at $S_w = 1 - S_{co}$, where $S_{co}$ is critical oil saturation (that is, HC does not flow). Capillary pressure is the entry pressure for the non-wetting phase to invade pores occupied by the wetting phase. In a two-phase oil-water system, capillary pressure is defined as:

$$p_{cow} = p_o - p_w \quad (1).$$

In the new IP method, the aqueous phase is considered to be the continuous phase. Aqueous phase pressure and potential are solved at the time steps allotted to the basin simulation. From the aqueous phase pressure solution, the HC phase potentials for the oil phase can be computed.

The aqueous phase potential can be calculated in parallel from the water pressure solution at a basin time step by:

$$\Phi_w = p_w - \rho_w g z \quad (2).$$

The oil phase potential for every grid cell can be defined as:

$$\Phi_o = p_o - \rho_o g z$$

$$\Phi_o = p_w + P_{cow} - \rho_o g z$$

$$\Phi_o \Phi_w - (\rho_w - \rho_o) g z + P_{cow} \quad (3).$$

Another derivation for the invasion percolation for the $CO_2$ sequestration problem has been shown where the aqueous phase potential is a constant and oil movement is a result of the interplay between buoyancy and capillarity. In Equation (3), z is the datum depth. The difference in the oil phase potential of a grid cell relative to all of its adjacent grid cells determines a migration pathway taken by oil in the new IP method. Oil migrates from a greater-potential cell to a low-potential cell. Excess oil in a cell moves to a neighboring cell with the least potential value. The remaining oil saturation in the migration pathway, also known as a stringer, is the critical oil saturation and the removing oil volume can be defined as:

$$V_{HC} = S_{co} \cdot \phi \cdot V \quad (4).$$

Accumulation begins when oil arrives at a grid cell whose potential value is less than all of its neighboring cells. The trap is filled from the first accumulated cell to its neighboring cell with the least oil potential. The filled oil volume can be calculated as:

$$V_{HC} = (1 - S_{wc}) \cdot \phi \cdot V \quad (5),$$

where $S_{wc}$ is the connate water saturation.

Accumulated oil in the trap must satisfy a vertical equilibrium condition. Therefore, all filled grid cells in the trap will arrive to the same potential value. During the filling process, the trap oil potential must be increasing and the potential must be at least the potential of the last filled cell. Since oil accumulation occurs discretely, and each grid cell can have a different thickness and depth, the potential value for the trap is updated with the potential of the last filled cell plus the incremental buoyancy potential is equal to half of the cell thickness:

$$P_B = (\rho_w - \rho_o) g \frac{\Delta z}{2}. \quad (6)$$

Equation (6) implies that the water-oil contact depth is approximated to be at the bottom of the last filled grid cell, if that is a larger value than the trap potential prior to its filling.

The processes related to migration and accumulation using the new IP method poses many parallelization challenges. In distributed-memory parallel processing, the basin domain is partitioned into several subdomains, where each subdomain is assigned to a computational process worked on by a computing core of a CPU of the HPC cluster. Therefore, as previously-stated, a trap can span multiple subdomains and the source points can also extend across multiple subdomains. In simulating the migration process from the source rocks to the traps, the HC may move from one computational process to another computational process. This necessitates data communication to exchange migration information from one subdomain to a neighboring subdomain(s).

In parallel, backfilling would be a difficult computational challenge as it requires building a list of neighboring grid cells, whose least resistance would be determined from their corresponding oil potentials. These lists are used when determining a next-best grid cell to invade. Since a trap can span multiple subdomains, the next-best grid cell to invade can reside on a non-neighboring subdomain. The parallelization of backfilling results in necessary communication between non-neighboring subdomains that may be allocated on different computing nodes of an HPC cluster.

In typical implementations, the previously-described MPI standard is used for inter-process communication. An outer halo is an outer boundary layer of grid cells belonging to the neighboring subdomains but information is maintained on the current subdomain to facilitate concurrent computation of parallel processes. An inner halo is an inner boundary layer of grid cells belonging to the current subdomain.

FIG. 1A is a flowchart illustrating a parallel-processing IP method 100*a* for a two-phase oil-water system that is targeted for distributed-memory, HPC clusters, according to an implementation. For clarity of presentation, the description that follows generally describes method 100*a* in the context of the other figures in this description. However, it will be understood that method 100*a* may be performed, for example, by any suitable system, environment, software, and hardware, or a combination of systems, environments, software, and hardware, as appropriate. In some implementations, various steps of method 100*a* can also be run in parallel, in combination, in loops, or in any order.

In FIG. 1A, method 100*a* interleaves between a parallel invasion process (for example, the top half of FIG. 1A) and a parallel accumulation process (for example, the bottom half of FIG. 1A). Method 100*a* targets a parallel implementation where several concurrent processes are working to solve a problem. For example and as described, during invasion (invade) (120), each process handles migration of stringers (where stringers exist for that process) until all have merged with a trap (145), is lost to a boundary, or migrates out of the subdomain (140) belonging to current process. During accumulation (155), all excess HC is used to build the traps which may span multiple subdomains (processes). Step 165 handles an accumulation tip shift from one process to another. As a trap grows, it may combine with another trap. Step 175 handles merger of traps in this situation.

At 110, a determination is made as to whether HC has been expelled (for example, if kerogen in the source rocks has undergone enough temperature change to react and expel HCs). If it is determined that HC has been expelled, (for example, if one subdomain is found to contain expelled HC/source points), a collective communication subroutine is used to communicate to all processes that all subdomains must jointly proceed to 115. Otherwise, if it is determined that HC has not been expelled, method 100*a* proceeds to 190.

At 115, all the potential trap peaks are identified/marked. Here, method 100*a* checks absolute oil phase potential values and finds particular cells where all cell neighbors have a greater potential value than that of the particular cell.

Figures 2A, 2B:
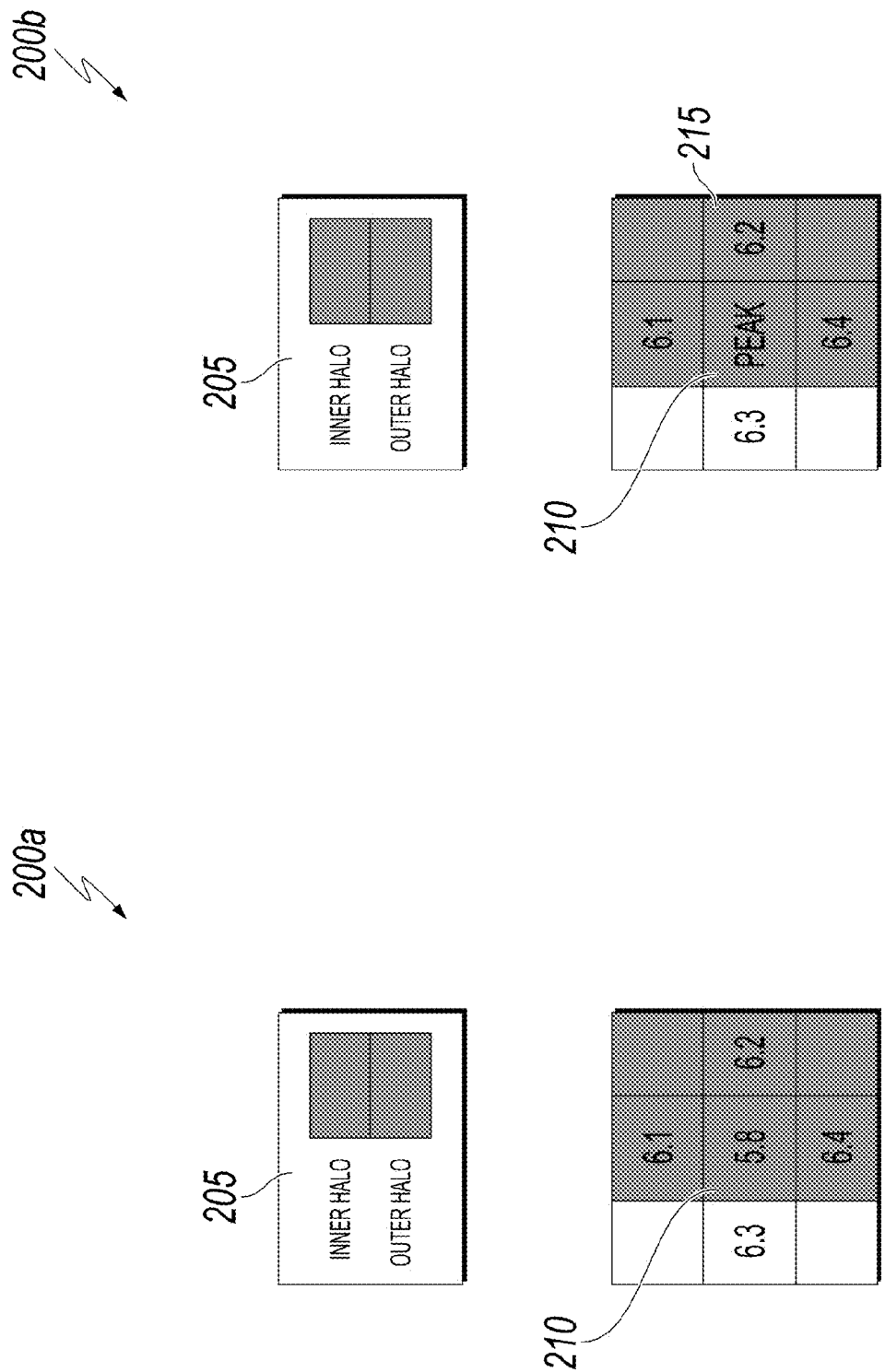
FIG. 2A is a block diagram of trap peak identification at the boundary between an inner halo and outer halo, according to an implementation.
FIG. 2B is a block diagram illustrating the identification of a trap peak on the inner halo based on a neighboring value on the outer halo, according to an implementation.

Turning to FIG. 2A, FIG. 2A is a block diagram 200*a* of trap peak identification at the boundary between an inner halo and outer halo (refer to legend 205), according to an implementation. Here, the local minima (5.8) is shown in grid cell 210. Following an identification of the grid cell 210 as a trap peak, the grid cell 210 will be marked as a trap peak (as illustrated in FIG. 2B) but will remain inactive until HC migrates into it. For the identification, parallelization is needed to populate oil phase potential value on the outer halo grid cells of every subdomain. Since a trap peak can reside on the inner halo, the outer halo oil phase potential values are necessary to make that decision.

Turning to FIG. 2B, FIG. 2B is a block diagram 200*b* illustrating the identification of a trap peak on the inner halo based on a neighboring value on the outer halo, according to an implementation. As illustrated, the value (6.2) of grid cell 215, which resides on the outer halo, is needed to determine that 5.8 is in fact the least oil phase potential value of its neighbors. Note that the described approach considers neighboring grid cells which share a cell face with the current grid cell. Accordingly, grid cells diagonal to grid cell 210 (with value 5.8) are not considered. As will be appreciated by those of ordinary skill in the art, in other implementations, the described approach can be modified to permit comparison of diagonal grid cells or grid cells in a third (or greater) dimension. Accordingly, grid cell 210 is identified as the trap peak.

The global index of the identified trap peak (grid cell 210) is mapped from a local index and stored. These trap peak indices are used for the described trap logic. The global index is used to distinguish and identify traps and their associated backfilled cells, boundary lists, and oil phase potential values. To access necessary trap information, a local copy of a global array of all active traps and associated information is configured to be stored on all processors.

In typical implementations, a global active trap array contains information illustrated in Table 1:

TABLE 1

| 0 | Invasion tip index |
|---|---|
| 1 | Invasion tip processor number |
| 2 | Constant HC potential of the trap |
| 3 | Trap Peak Global Index |

In other implementations, more or less information can be included in Table 1. Returning to FIG. 1A, from 115, method 100*a* proceeds to 120.

At 120, an invasion process is started. The invasion process involves multiple steps of method 100*a* (delineated by dashed box 121). Here, HCs from the expulsion sites move by following the IP rule, which looks for lesser oil phase potential values of neighboring grid cells. If lesser oil phase potential values are found, then the grid cell containing the least oil phase potential value is chosen as the next cell to invade. The HC volume leaves that site and enters the new invasion site, but is decreased by the volume due to the remaining critical pathway saturation, which is calculated as in Equation (4). If a grid cell is newly invaded that is in a migration path and already contains non-residual amounts of HC, then that amount must be added to the excess HC being migrated. The flow from a source point to the next invasion site begins locally on every processor. Every processor that has HC volumes in the cells go through the invasion routine, HC moves along the potential gradient from greater-to-low until the HC migration stops. From 120, method 100*a* proceeds to 125.

At 125, a determination is made as to whether HC is migrating. Method 100*a* continuously checks for HC migration. If it is determined that HC is migrating, method 100*a* proceeds back to 120 and the invasion continues. Otherwise, if it is determined that HC is not migrating, method 100*a* proceeds to 130.

At 130, a determination is made as to whether HC movement is halted (for example, has HC/a migration stringer reached a filled trap?). If it is determined that HC movement is halted, method 100*a* proceeds to 145. Otherwise, if it is determined that HC movement is not halted, method 100*a* proceeds to 135.

At 145, the migration stringer is merged with the trap. From 145, method 100*a* proceeds back to 120.

At 135, a determination is made as to whether HC movement has halted because the HC has reached the boundary of the particular subdomain. The referenced boundary is the internal boundary of the basin system but the external boundary of the subdomain. This is also known as the outer halo of the subdomain. If it is determined that movement has halted because the HC has reached the boundary of the particular subdomain, method 100*a* proceeds to 140. Otherwise, if it is determined that movement has not halted because the HC has reached the boundary of the particular subdomain, method 100*a* proceeds to 150 to begin an accumulation process (delineated by dashed box 151).

At 140, once HC movement stops on all processors and HC volume resides on the outer halo, then method 100*a* communicates (sends) all HC on the outer halos to neighboring subdomains' inner halo.

Turning to FIG. 3, FIG. 3 is a block diagram 300 illustrating HC exchange during a flow routine, according to an implementation. Refer to legend 205 for identification of inner and outer halo grid cells in FIG. 3. Here, it can be seen that HC has reached the outer halo grid cell 305 in Subdomain 1 310. As explained in 140, method 100*a* sends all HC on the outer halo grid cells (for example, grid cell 305 of Subdomain 1) to neighboring subdomains' inner halo grid blocks (for example, inner halo grid cell 315 of Subdomain 2 320. In the described implementation, HC is considered to traverse non-diagonally. As will be appreciated by those of ordinary skill in the art, in other implementations, the described approach can be modified to permit HC to traverse diagonally.

The method 100*a* alternates between moving the HCs locally and communicating the HC volumes at the subdomain boundaries until the system reaches a point when no more HCs move on any of the processes. No more movement indicates that all the HCs have reached locations where no additional lesser oil potentials exist, and therefore, cannot move further (these are the earlier-identified trap peaks).

In some implementations, some HCs can migrate out of the basin system through the external boundaries, and are considered HC losses. Once the invasion process ends, method 100*a* proceeds to the accumulation processes. In parallel, method 100*a* waits for all processors to complete the migration process and for all expelled HC to reach their associated trap peaks and cannot flow any further. Returning to FIG. 1A, from 140, method 100*a* proceeds back to 120.

At 150, a determination is made as to whether searches through the cells that contain HC volume indicate that HC volume is in excess. Backfilling begins when HC volume in a cell has nowhere to migrate, and contains a volume greater than the accumulation saturation value. Initially, the cells that would be found in excess would be at the trap peaks that were previously identified. Once HC has entered a trap peak, the trap peak becomes active and backfilling begins. Backfilling displaces all mobile water in the filled cell and replaces it with HC as in Equation (5). If it is determined that an excess condition exists, method 100*a* proceeds to 155. Otherwise, if it is determined that an excess condition does not exist, method 100*a* proceeds to 180.

A spill occurs during backfilling when a newly invaded cell has a direct neighbor with an oil phase potential value less than its own. The HC can then migrate and a break occurs from the backfilling process. The accumulation process continues until all traps are filled to completion or until a spill point is reached, where method 100*a* switches back to the invasion process. Until switch to the invasion process, a spill point index containing the excess HC volume to be migrated is flagged so that the cell can be skipped by the backfilling process until the routine has completed processing of all the remaining active traps.

Breakthroughs occur when the oil potential in the accumulation body has increased to a point where the next best grid cell to invade would belong to one of the seal points. The breakthrough point would be the weakest potential point on the seal. After that seal breakthrough point is invaded with the excess HC volume, the backfilling routine would handle the breakthrough as a spill would be handled. The seal grid cell would search its direct neighbors and if a neighboring cell with lesser potential value is found, the oil would migrate. The code would exit the backfilling routine and the migration routine would begin again.

After a spill, HC begins to migrate. The HC can migrate out of the model as a migration loss, into an inactive trap, or could migrate to a trap that was previously accumulated, which, in this case, a merge would take place.

Note that the merging performed in 135 would have to take place if the HC has migrated to a point where no lesser potential exists except that of an already accumulated cell. The accumulated cell had been tagged during the accumulation stage, therefore the invasion tip along with its processor number can become known by searching through the active trap array. Once that information is known, the excess HC volume would be sent to the trap invasion tip. The invasion tip could reside on a different subdomain, which can be determined from the second entry in the active trap array. MPI would be used to send the excess HC volume to that processor.

At 180, a determination is made as to whether a spill has occurred during backfilling. If it is determined that spill condition exists, method 100*a* proceeds back to 120. Otherwise, if it is determined that a spill condition does not exist, method 100*a* proceeds to 185.

At 185, an updated HC potential value is assigned to the corresponding trap and the value is stored in the global active trap array. Updating of the HC potential values in the potential array only happens at the end of the new IP method for efficiency purposes. Once the new IP method is about to exit (at step 190), the array of accumulated indices tagged with the global trap peaks is searched, along with the active trap array, and the corresponding HC-updated trap potential replaces the absolute HC potential values of the accumulated cells. The updating process takes place in accordance with the rule that the accumulation body is at static equilibrium and there is no flow within the accumulation. From 185, method 100*a* proceeds to 190.

At 190, method 100*a* exits. In some implementations, post-processing or other functions can be performed on any data consistent with this disclosure prior to method 100*a* exiting. For example, a notification of exit can be generated and transmitted, and the exit notification can include reporting data for analysis.

At 155, accumulation of HC occurs in grid cells in order from lesser-to-greater potential value. Movement of HC occurs between neighboring grid cells. The neighboring grid cells are searched for a grid cell with the least potential value. This grid cell is selected as the grid cell to invade.

Figures 4A, 4B:
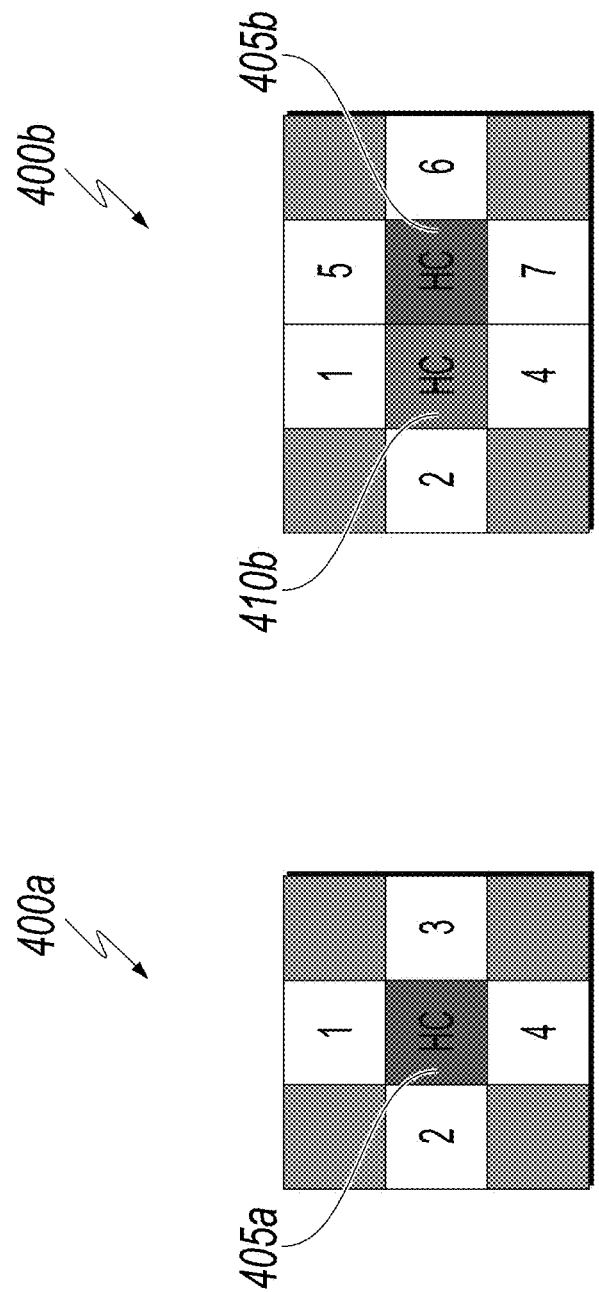
FIG. 4A is a block diagram illustrating the initial step where a grid cell is marked as containing excess HC volume, according to an implementation.
FIG. 4B is a block diagram illustrating a trap peak marked as containing excess HC volume and the invaded neighboring cell with the least potential value becomes an accumulated grid cell, where all of its neighboring cells have a greater potential value, according to an implementation.

Turning to FIG. 4A, FIG. 4A is a block diagram 400*a* illustrating the initial step where a potential trap peak (as previously identified at 115 of FIG. 1A) is marked as containing excess HC volume, according to an implementation. With respect to FIG. 4A, grid cell 405*a*, the potential trap peak, is marked as containing excess HC volume. Turning to FIG. 4B, FIG. 4B is a block diagram 400*b* illustrating a trap peak marked as containing excess HC volume and the invaded neighboring cell with the least potential value becomes an accumulated grid cell, where all of its neighboring cells have a greater potential value, according to an implementation. With respect to FIG. 4B, the trap peak grid cell 405*b* is marked as containing excess HC volume and neighboring grid cell 410*b* is marked as an accumulated grid cell.

Neighboring grid cell indices would be added to the boundary list along with their corresponding potentials, which would be added to a potential list. These lists would be used together when searching for the next best grid cell to invade as an accumulation is taking place. The grid cell index with the corresponding least potential value would be chosen as the next best grid cell to invade.

For example, if grid cell 3 in FIG. 4A contains the least potential in that particular neighborhood, it is chosen to be the next invasion target and will be filled with the excess HC from grid cell 405a. The trap grid cell oil volume was set according to Equation (5) and the excess HC volume of the trap decreased by that amount. The filled cell becomes a part of the trap and the trap potential is updated using Equation (6).

In the new IP method, one HC updated value is kept per trap. The new neighbors of a newly invaded grid cell are then checked, and if the new neighbors have potentials greater than the newly invaded cell, backfilling continues and the new neighbors are added to the boundary list.

FIG. 4B illustrates that grid cell 3 (405b) (for example, grid cell 3 in FIG. 4A) was invaded from grid cell 405a (for example, from FIG. 4A). New grid cells are added to the boundary list (here, grid cells 5, 6, and 7). All grid cells that are backfilled after reaching the trap peak are marked with the trap peak's global index value. This masking process is used to identify which backfilled cells belong to which traps. In a serial-processing manner, the process continues until the HC volume is used up or a spill point or breakthrough is reached.

Returning to FIG. 1A, from 155, method 100a proceeds to 160.

At 160, a determination is made as to whether HC accumulation is occurring on another computing processor (whether HC has invaded the outer halo of a subdomain or when an index residing on a different subdomain is chosen as the least potential index). In parallel-processing, backfilling of a trap can extend across several subdomains.

Figure 5:
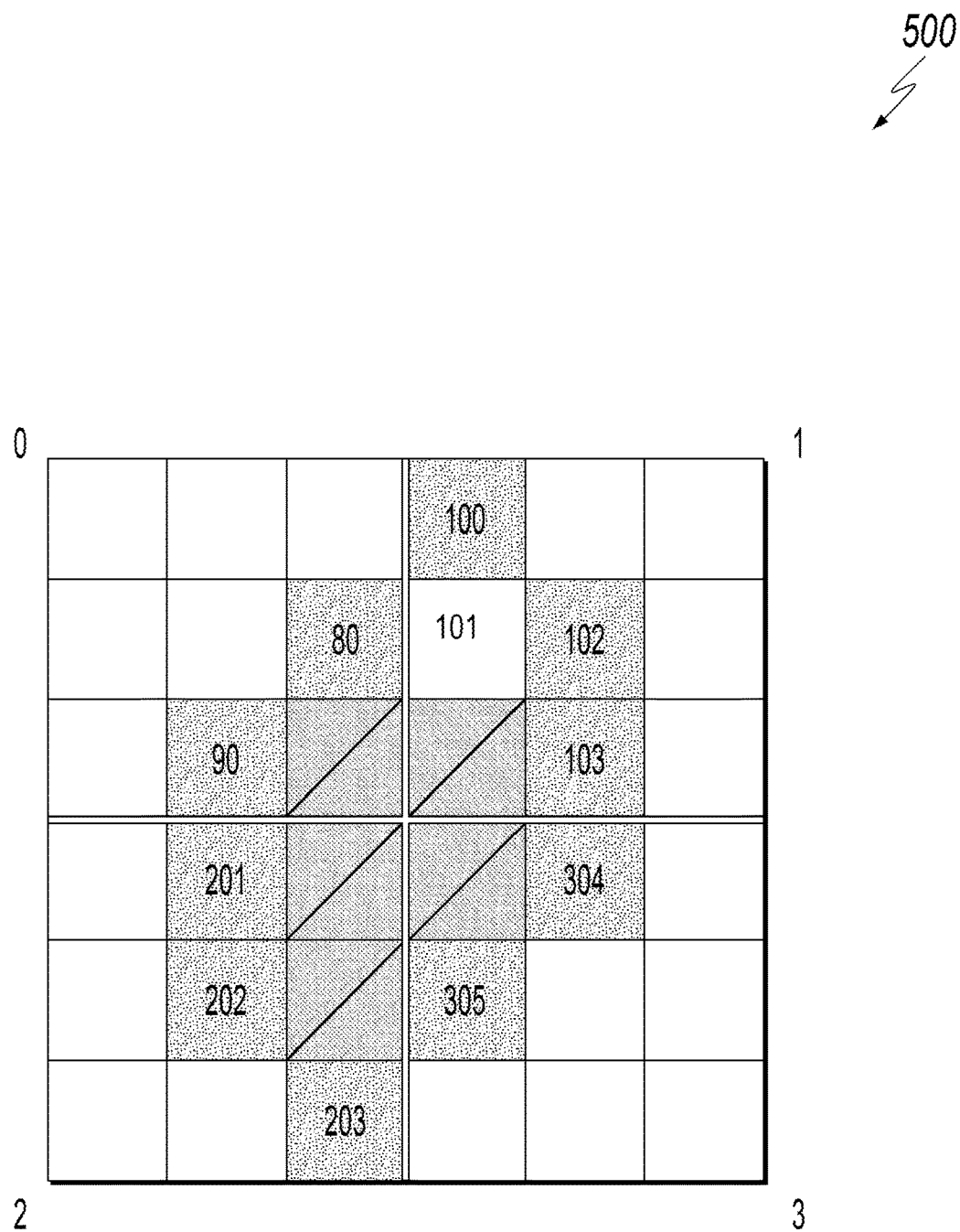
FIG. 5 is a block diagram illustrating an accumulation that extends across four different subdomains numbered 0 to 3, according to an implementation.

Turning to FIG. 5, FIG. 5 is a block diagram 500 illustrating an accumulation that extends across four different subdomains numbered 0 to 3, according to an implementation. The illustrated grid cells with a diagonal line represent backfilled grid cells, grid cell 101 represents the invasion tip, which contains the excess HC volume, and the grey shaded grid cells represent the boundary cells of the trap.

Returning to FIG. 1A, if it is determined that HC accumulation is occurring on another computing processor, method 100a proceeds to 165. Otherwise, if it is determined that HC accumulation is not occurring on another computing processor, method 100a proceeds to 170.

At 165, parallel communication takes place. If the index on the outer halo is chosen, its index would first be mapped to the corresponding inner halo index value of the subdomain where that cell actually resides. In an effort to reduce communication overhead, the boundary lists are created locally on every subdomain and resides there. Every subdomain finds the boundary index with the least resistance locally. The global minimum location is found. If boundary grid cells exist in the list that are on the outer halo of the subdomain that is undergoing accumulation, the method filters the outer halo indices and removes those cells from the local boundary list. The outer halo cells are sent to the correct processor where they reside and a boundary list tagged with the trap identifier is created on the corresponding inner halo of the subdomain. The new IP method guarantees that the boundary lists only contain local indices. The processor with the invasion tip receives the single boundary index with the least potential along with its potential value that resides on other subdomains.

Figure 6:
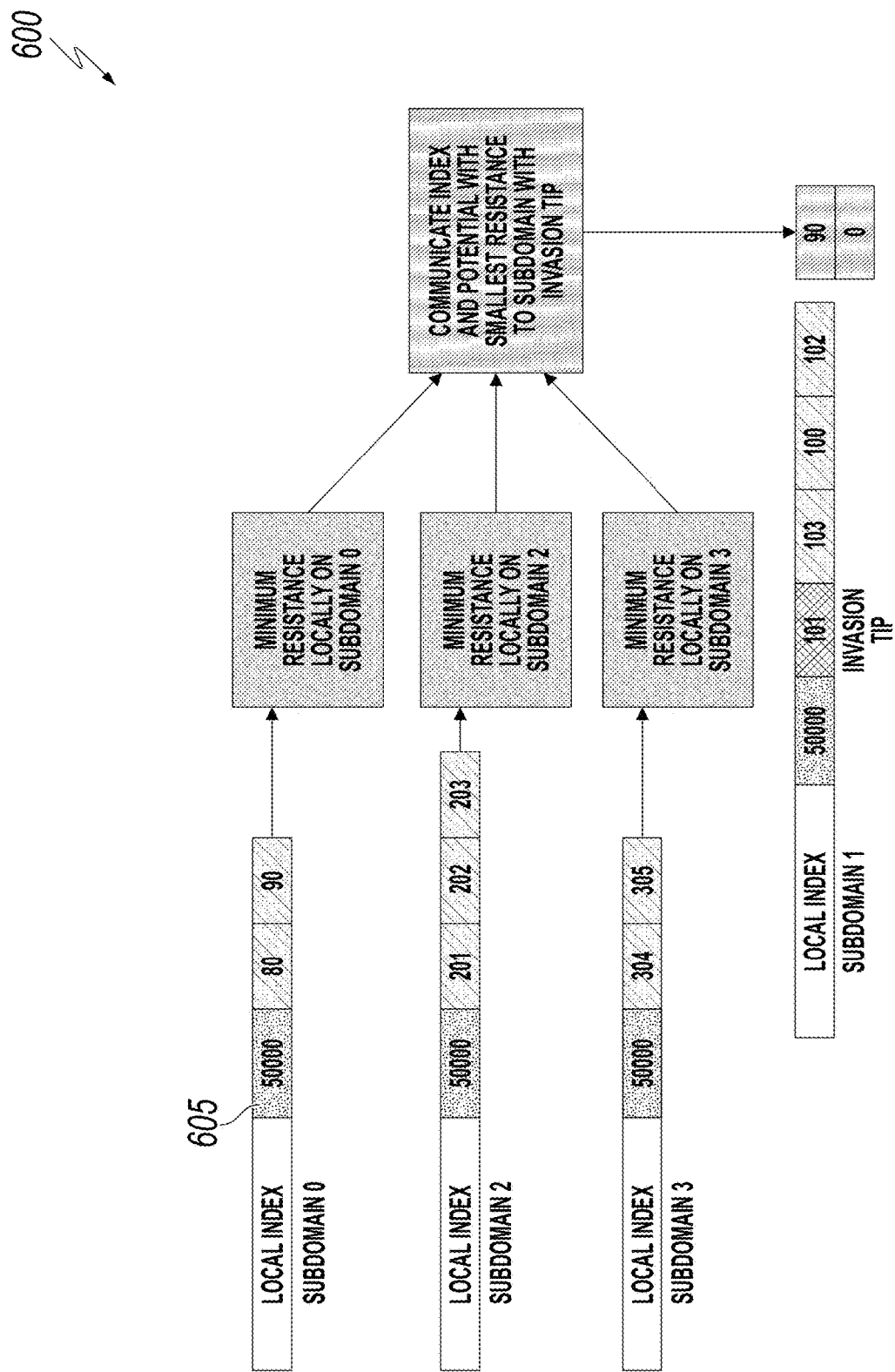
FIG. 6 is a block diagram illustrating communication performed when accumulation takes place over multiple subdomains, according to an implementation.

Turning to FIG. 6, FIG. 6 is a block diagram 600 illustrating communication performed when accumulation takes place over multiple subdomains, according to an implementation. The subdomains apart from the one containing the invasion tip that contain boundary lists pertaining to the trap find the least resistance index and send the least resistance index and potential value between them to the subdomain with the invasion tip. Once the HC leaves the subdomain, the excess HC volume, the least resistance boundary index and its corresponding potential value are sent to the new subdomain in which the HC has invaded. The shaded grid cell 605 is the trap identifier, which is the corresponding global number of the trap peak indices found previously. From 165, method 100a proceeds to 170.

At 170, a determination is made as to whether traps are sharing an accumulation boundary. In the backfilling stage, merging would occur if one trap's invasion tip gets chosen to be backfilled by another trap. 170 checks this condition, and, if it were to occur, the excess HC residing in the first trap's invasion tip along with the excess HC volume of the second trap are summed and the two traps must be merged. If it is determined that traps are sharing an accumulation boundary, method 100a proceeds to 175. Otherwise, if it is determined that traps are not sharing an accumulation boundary, method 100a proceeds back to 150.

At 175, traps are merged. This merging process is different than the previously-described stringer merge. Since backfilling is still ongoing, the invasion tip becomes a shared point between the two traps, and the boundary and potential lists must be merged as the two traps have become one entity. Additionally, the active trap peak arrays for each trap need to be merged, where the HC potential of the merged trap would have the same potential value and the global indices of the two traps are added to the same array.

Table 2 is an example illustrating how the active trap peak array would expand when a merge takes place:

TABLE 2

| | |
|---|---|
| 0 | Invasion tip index |
| 1 | Invasion tip processor number |
| 2 | Constant HC potential of the merged traps |
| 3 | Trap Peak Global Index 1 |
| 4 | Trap Peak Global Index 2 |

The accumulation process takes place one trap at a time on a processor; however, one subdomain can receive information from more than one subdomain. This would occur if the one subdomain happens to have two or more neighboring subdomains with growing accumulations that expand into it.

Figure 7:
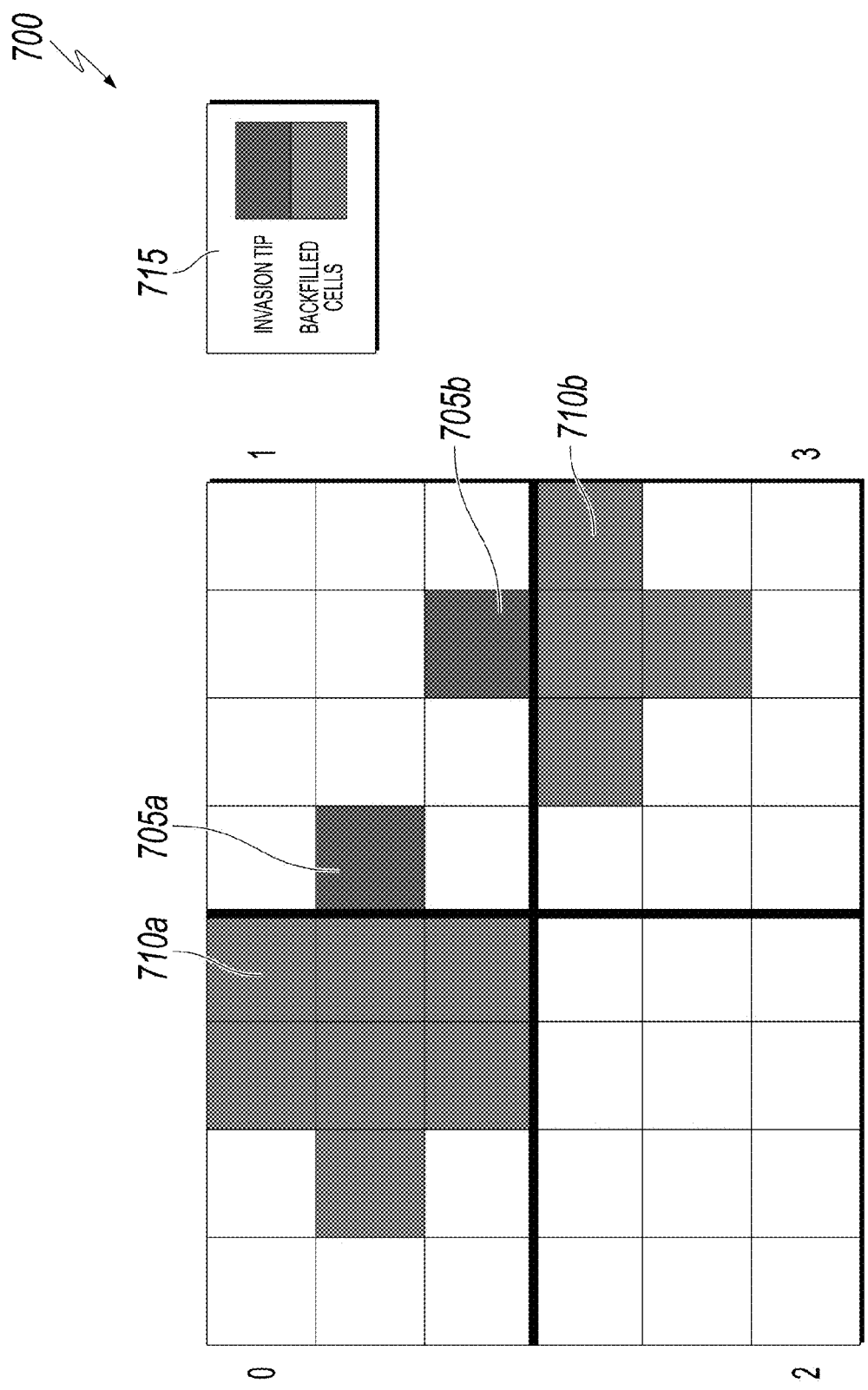
FIG. 7 is a block diagram illustrating one subdomain receiving information from more than one subdomain, according to an implementation.

Turning to FIG. 7, FIG. 7 is a block diagram 700 illustrating one subdomain receiving information from more than one subdomain, according to an implementation. As illustrated, two invasion tips (for example, 705a and 705b) from two traps (for example, traps 710a and 710b, respectively) are accumulating simultaneously into one subdomain (here, subdomain 1). Note legend 715 for colors associated with invasion tips and backfilled grid cells. When communicating more than one trap information to a processor, the information communicated is associated with its particular trap. As previously mentioned, boundary lists are tagged in their first index with a trap identifier, which is the global trap peak index. The excess HC would be sent to the invasion tip index, which can be determined from the active trap array. The accumulation process continues until a spill or breakthrough occurs or when no more excess HC exists. The new IP method continues to backfill on all processors until all processors have reached a point where backfilling has been completed.

Returning to FIG. 1A, from 175, method 100a proceeds back to 150.

Figure 1B:
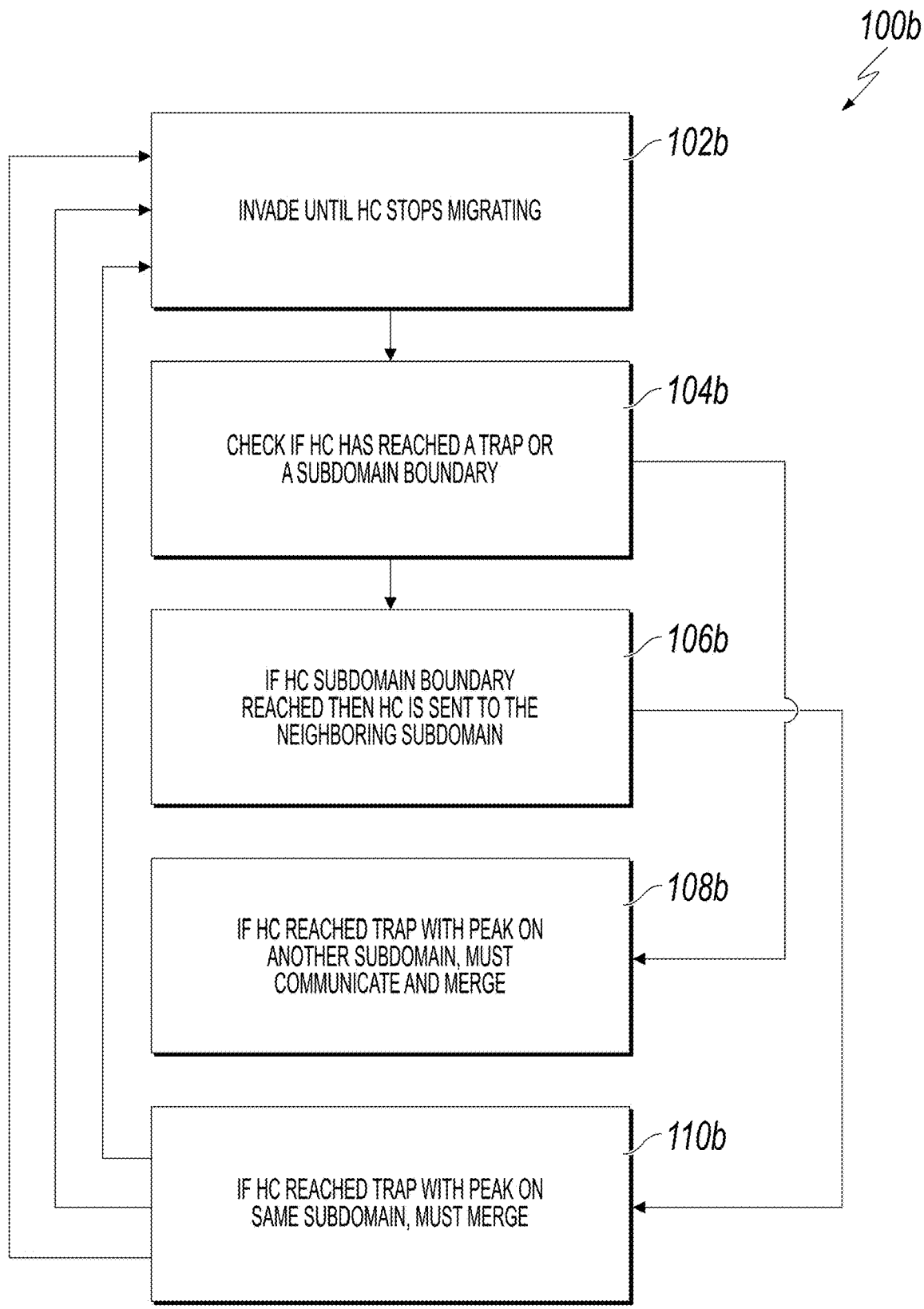
FIG. 1B illustrates a flow chart restating the method steps delineated by box 121 in FIG. 1A, according to an implementation.

Turning to FIG. 1B, FIG. 1B illustrates a flow chart 100b restating the method steps delineated by dashed box 121 in FIG. 1A, according to an implementation.

At 102b, invasion occurs until HC stops migrating. From 102b, method 100b proceeds to 104b.

At 104b, a check is performed as to whether HC has reached a trap or a subdomain boundary. If the HC has reached a subdomain boundary, method 100b proceeds to 106b. If the HC has reached a trap, method 100b proceeds to 108b.

At 106b, if an HC subdomain boundary is reached, then the HC is sent to a neighboring subdomain and flow proceeds to 110b, otherwise flow returns to 102b.

At 108b, if the HC has reached a trap with a peak on another subdomain, then communication and merging occurs and flow proceeds back to 102b, otherwise, otherwise flow returns to 102b.

At 110b, if the HC has reached a trap with a peak on a same subdomain, merging occurs and flow return to 102b.

The invasion process continues until no more HC movement occurs in the system. If HC in any grid cell contains a volume larger than the grid cell volume, the system is in disequilibrium and the accumulation process takes place.

Figure 1C:
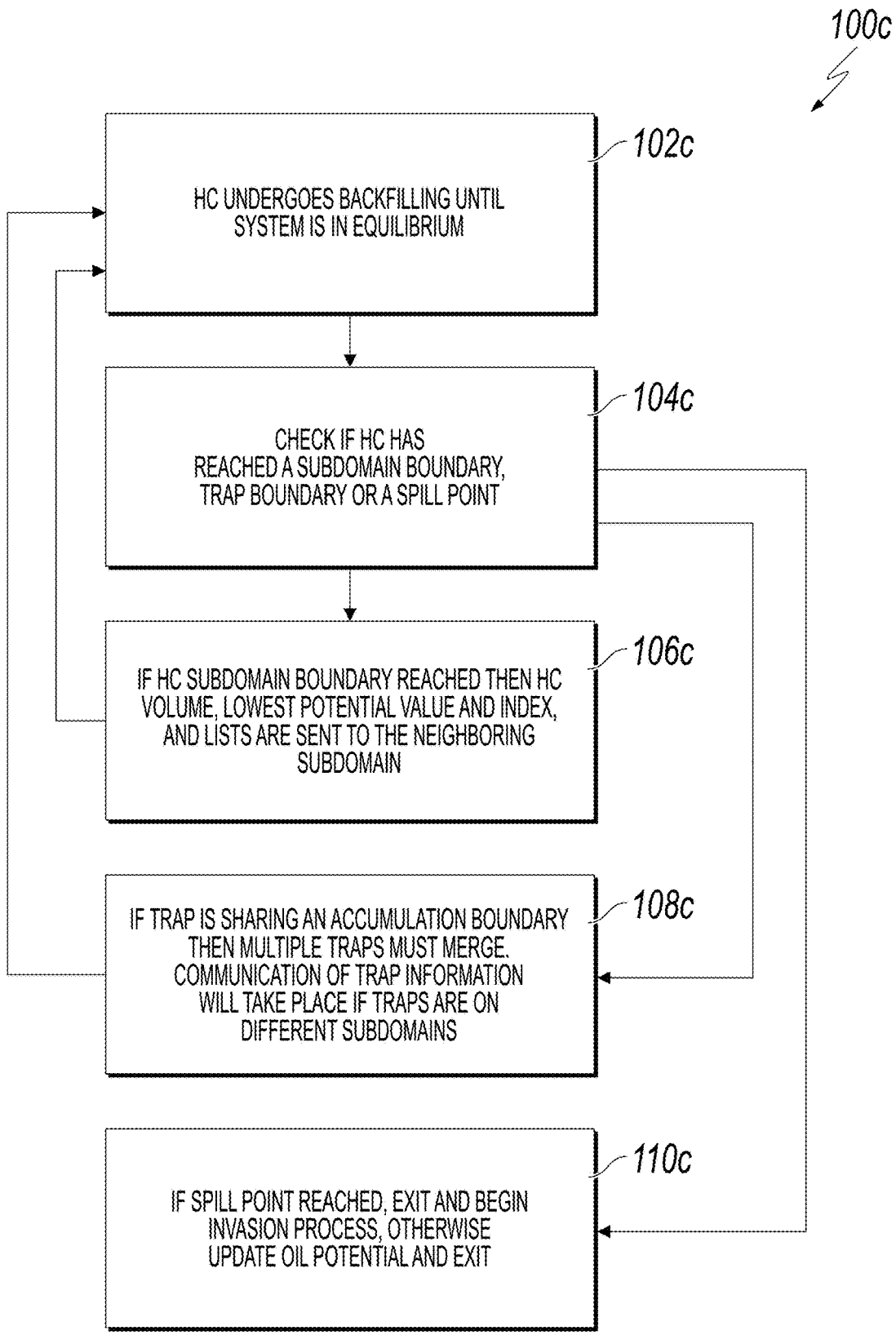
FIG. 1C illustrates a flow chart restating the method steps delineated by box 151 in FIG. 1A, according to an implementation.

Turning to FIG. 1C, FIG. 1C illustrates a flow chart 100c restating the method steps delineated by box 151 in FIG. 1A, according to an implementation.

At 102c, the HC undergoes backfilling until the system is in equilibrium. From 102c, method 100c proceeds to 104c.

At 104c, a check is performed as to whether HC has reached a subdomain boundary, a trap boundary, or a spill point. If the HC has reached a subdomain boundary, method 100c proceeds to 106c. If the HC has reached a trap boundary, method 100c proceeds to 108c. If a spill point is reached, method 100c proceeds to 110c.

At 106c, if an HC subdomain boundary is reached, then the HC volume, least potential value and index, and lists are sent to the neighboring subdomain. From 106c, method 100c returns to 102c.

At 108c, if the trap is sharing an accumulation boundary, then multiple traps must merge. Communication of trap information will take place if traps are on different subdomains. From 108c, method 100c returns to 102c.

At 110c, exit and begin the invasion process described in FIGS. 1A and 1B.

Test Cases

The described new IP method has been tested (in serial and in parallel) on several basin models of various model sizes, including a model with hundreds of lithofacies and multiple source rocks. The largest model size tested was a 1.4 billion cell basin model at 250 meter (m) areal grid size. The results of two of the test cases are included in the paper. Using these test examples, a validation of the parallel implementation is show, as well as the computational performance and scalability of the method. With this method, ultra-large basin simulations can be run in a matter of a few hours, thereby providing geoscientists and engineers with the enhanced capability to perform high-resolution migration simulation for basin modeling.

Test Case 1

The model used consists of 135 grid cells in the x-direction and 135 grid cells in the y-direction with 82 stratigraphic layers, resulting in a model of size 1,494,450 grid cells. The areal gridding size is 2 kilometers (km) in both the x-direction and y-direction covering a surface area of 73,000 square kilometers ($km^2$). The simulation run begins at the first stratigraphic deposition at 550 million years ago (Ma) until present-day and uses a known kinetics model. The lithofacies for this model are simplified to use only two types; one rock type as the seal layer and the other rock type for the remaining stratigraphic layers.

Figure 8:
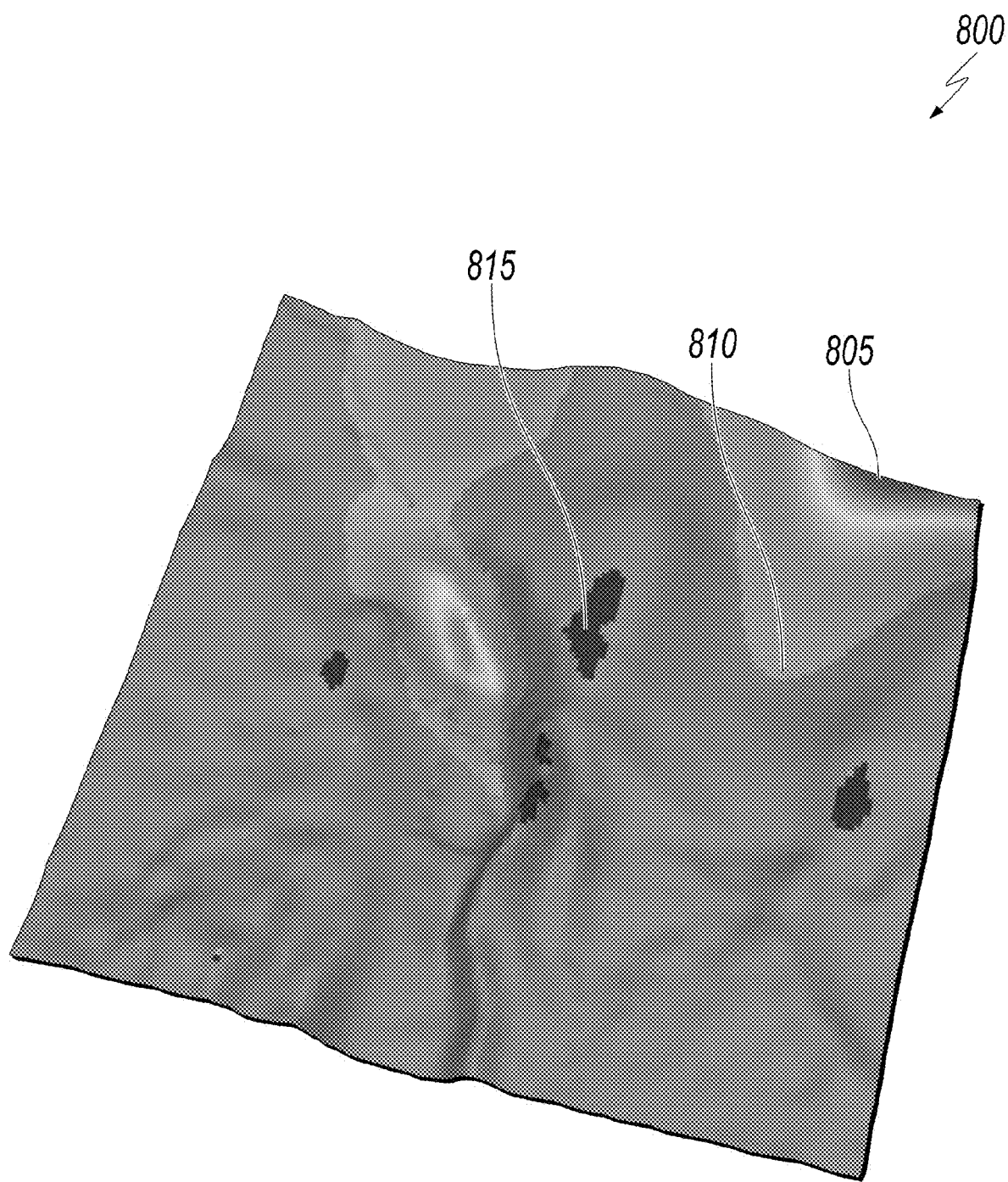
FIG. 8 is a plot illustrating results after running a Test Case 1 model on a single computing core, according to an implementation.

Turning to FIG. 8, FIG. 8 is a plot 800 illustrating results after running a Test Case 1 model on a single computing core, according to an implementation. As illustrated, the transformation ratio is ranging in color from red (for example, 805) to light blue (for example, 810), indicating a greater-to-low transformation, respectively. The transformation ratio represents how much of the kerogen has reacted and matured to produce the HC. The dark green and light green grid cells represent the accumulation saturation. As shown, the matured source rock is not directly under the accumulation bodies, and is in the northeast of the model indicating that HC has migrated from the source rock to the least potential points under the seal. After migration, the accumulation process was performed and the accumulation bodies are shown in FIG. 8. 815 is an example accumulation body.

Figure 9:
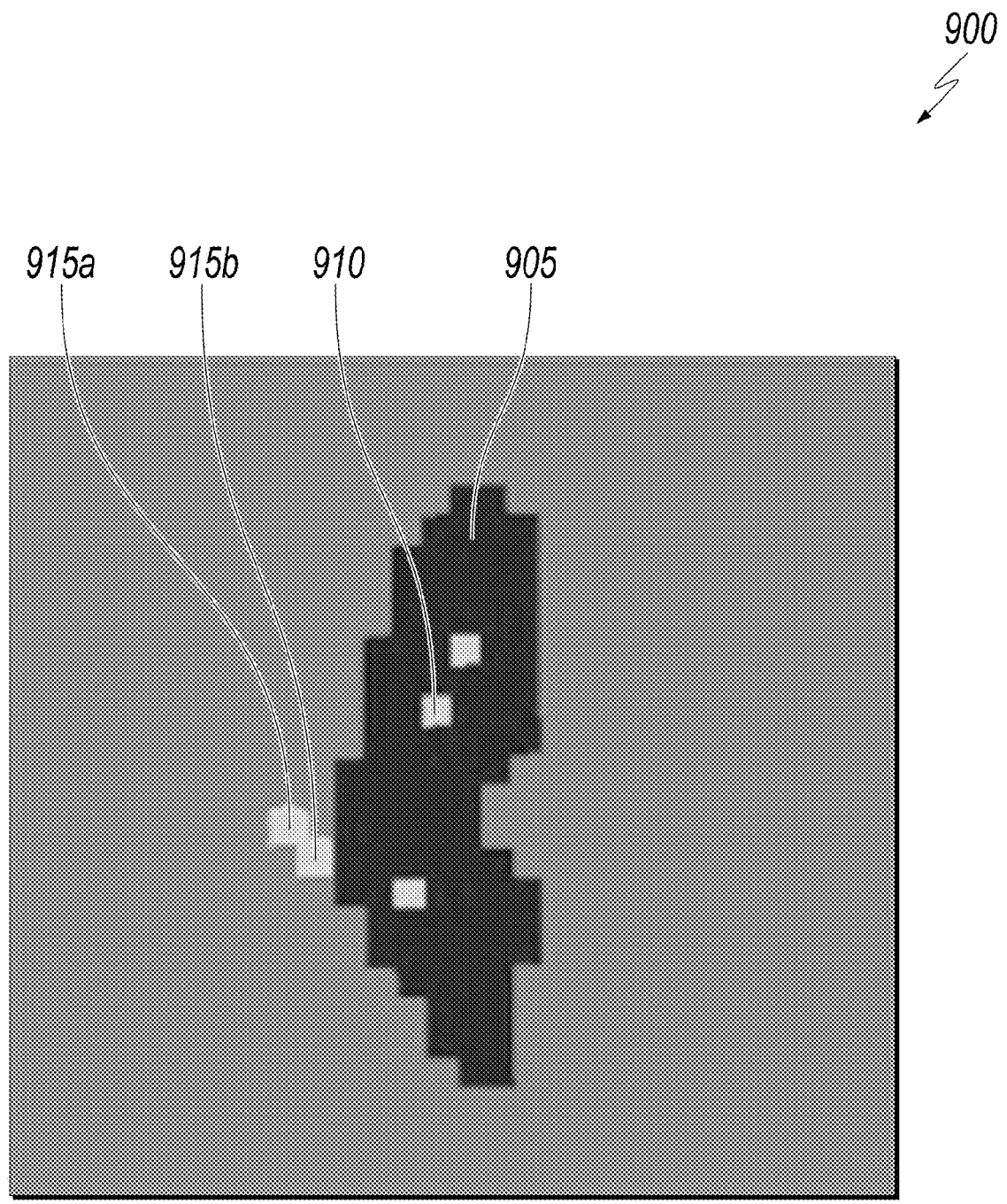
FIG. 9 is a plot illustrating an accumulation body including multiple trap peaks, according to an implementation.

Turning to FIG. 9, FIG. 9 is a plot 900 illustrating an accumulation body including multiple trap peaks, according to an implementation. Within the accumulation body 905, trap peaks are illustrated as yellow grid cells (for example, trap peak 910). In serial processing, this method would backfill one trap peak at a time and then accumulations associated with each of the three trap peaks are merged into one entity indicating that the merge method is functioning correctly. Note that the two grid cells 915a/915b adjacent to the accumulation body 905 are isolated trap peaks without HC accumulation.

Figure 10:
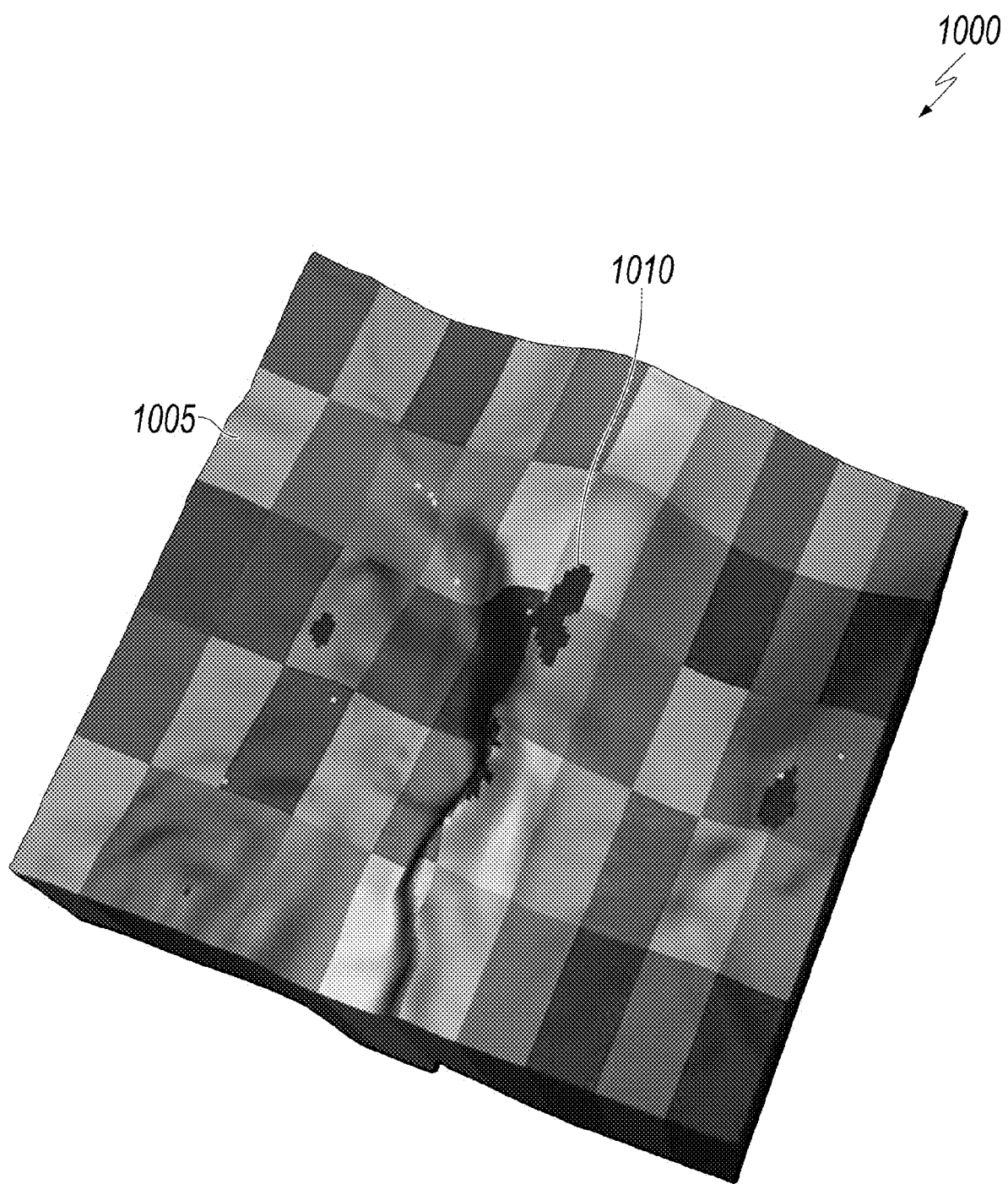
FIG. 10 is a plot of results of the test case of FIGS. 8-9 executed using 50 computing cores, according to an implementation.

Turning to FIG. 10, FIG. 10 is a plot 1000 of results of the test case of FIGS. 8-9 executed using 50 computing cores, according to an implementation. As illustrated, varying colored rectangles (for example, rectangle 1005) represent different subdomains. The results are shown to be identical (for example, see the accumulation body 1010 compared to the accumulation body 905 of FIG. 9 and the accumulation body 815 of FIG. 8), validating the parallelization of the new IP method. In other words, the accumulation body 1010 of FIG. 10 is identical to the accumulation body 905 of FIG. 9 (which is an enlarged cut-out view of the accumulation body 815 of FIG. 8).

Figure 11:
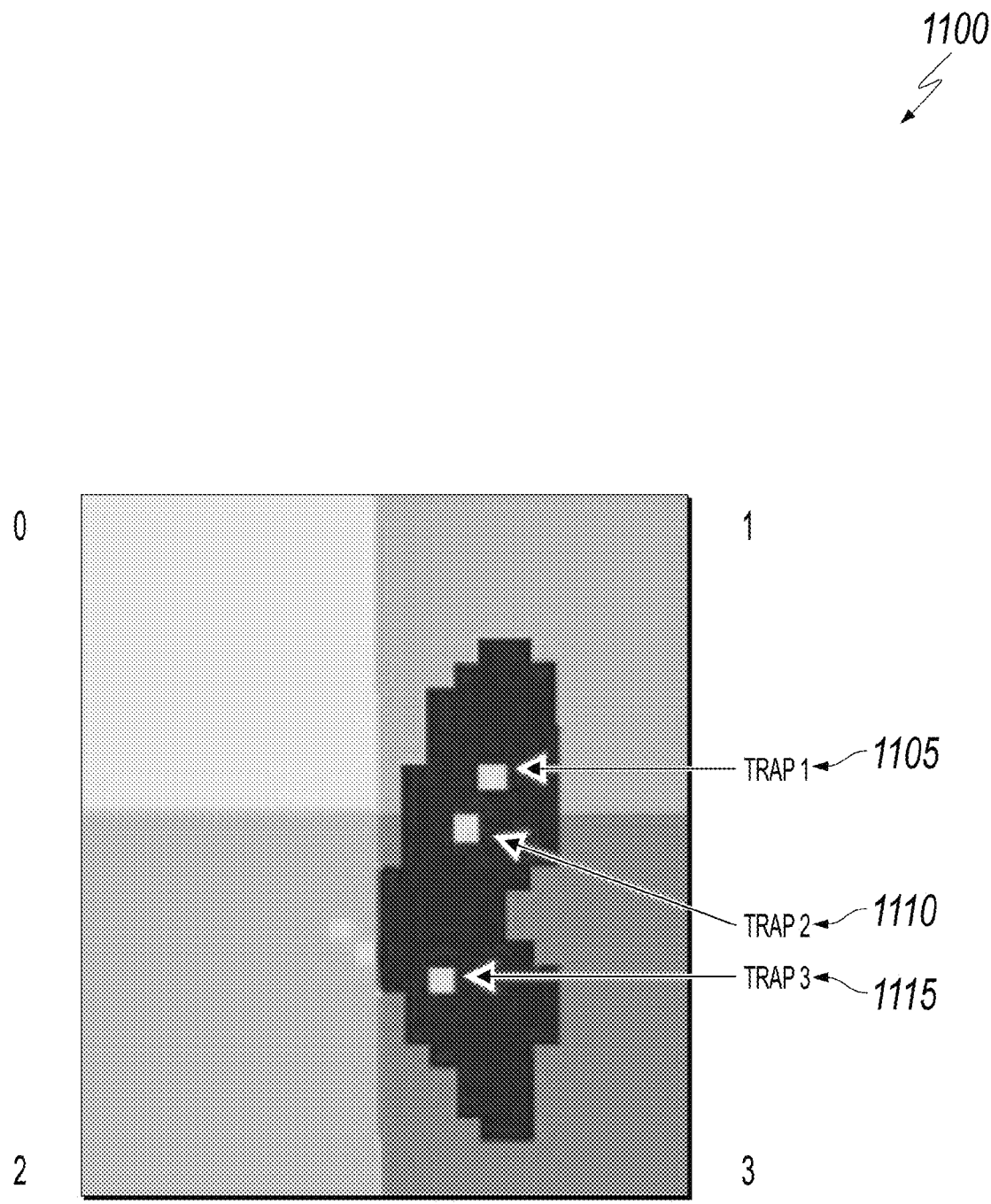
FIG. 11 is a plot illustrating trap peaks in a merger that reside on different subdomains, according to an implementation.

In terms of parallel mergers, the results are also shown to match the serial results. For example, turning to FIG. 11, FIG. 11 is a plot 1100 illustrating trap peaks in a merger reside on different subdomains, according to an implementation. As illustrated, subdomains are labeled 0-3. In this case, the parallel method would accumulate Trap 1 (1105) and Trap 2 (1110) simultaneously, since they reside on separate subdomains (0-3). Once Trap 2 (1110) has left subdomain 3 to accumulate into subdomain 1, Trap 3 (1115) will begin accumulating in subdomain 3. The accumulations from different traps on different subdomains are processed concurrently and result in the same accumulation geometries as the serial run, indicating that the parallel merging method is also functioning correctly.

Test Case 2a: Coarse-Grid Model

The second model consists of 535 grid cells in the x-direction and 505 grid cells in the y-direction with 82 stratigraphic layers resulting in a model of size 22,154,350 grid cells. The areal gridding size is 2 km in both the x-direction and y-direction covering a surface area of 1,080,700 km$^2$. Similar to Test Case 1, the simulation run begins at the first stratigraphic deposition at 550 Ma until present-day and uses the same kinetics model. Again, the lithofacies for this model are simplified to use only two types: 1) one rock type as the seal layer and 2) the other rock type for the remaining of the stratigraphic layers.

Figure 12:
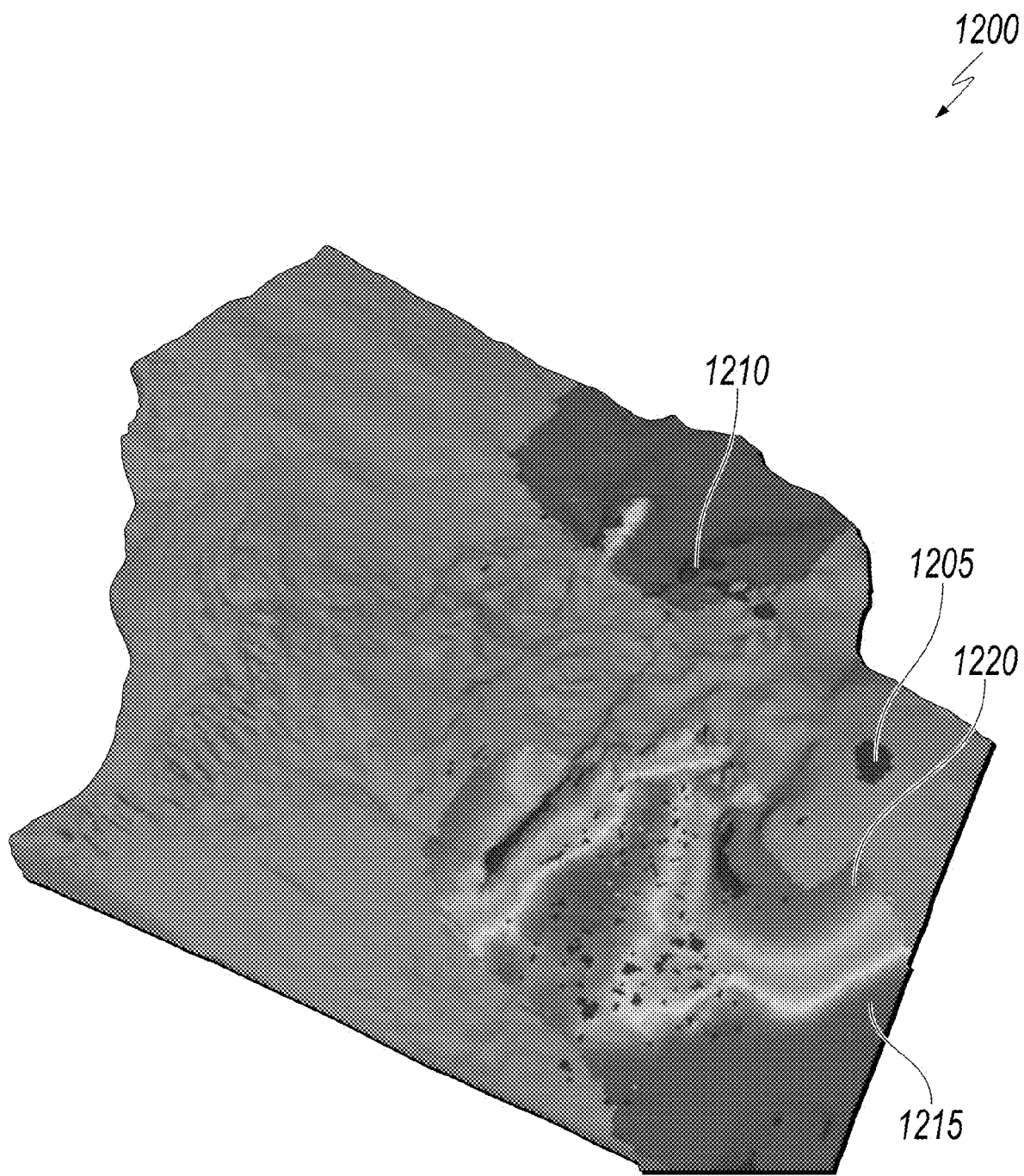
FIG. 12 is a plot illustrating results from a serial run of a Test Case 2a, according to an implementation.

Turning to FIG. 12, FIG. 12 is a plot 1200 illustrating results from a serial run of a Test Case 2a, according to an implementation. The dark green grid cells (for example, grid cells at 1205 and 1210) illustrate accumulation saturations (bodies). Colors ranging from red (for example, 1215) to blue (for example, 1220) illustrates the transformation ratio as previously described.

Using a laterally larger example that allows the HC to flow across larger distances without flowing out of the model boundary allows testing the capability of the invasion routine.

Several accumulation bodies are seen in regions far from the scope of the transformation ratio, illustrating again that expelled HC is migrating to regions of lesser potentials across the model. In parallel, the HC migrates across many more subdomains in this test case.

Figure 13:
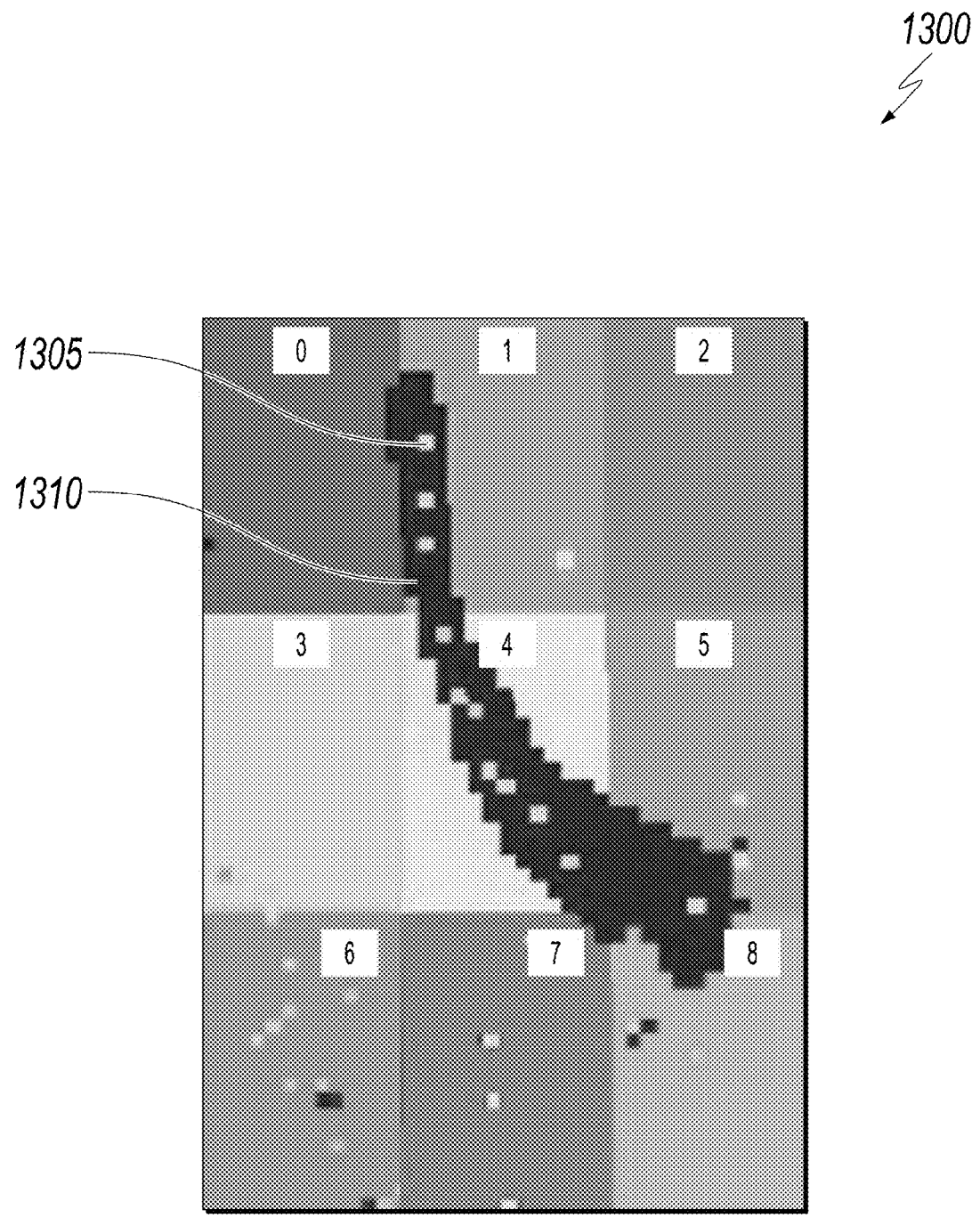
FIG. 13 is a plot illustrating mergers in the Test Case 2a occurring across multiple subdomains and extending across subdomains that are not directly adjacent to each other, according to an implementation.

Turning to FIG. 13, FIG. 13 is a plot 1300 illustrating mergers in the Test Case 2a occurring across multiple subdomains and extending across subdomains that are not directly adjacent to each other, according to an implementation. As illustrated, the displayed yellow grid cells (for example, grid cell 1305) illustrate the trap peaks of trap 1310. Trap 1310 has the potential to communicate with six different subdomains; 0, 1, 4, 5, 7, and 8. In trap 1310, backfilling can occur on a grid cell on subdomain 1, then the next cell to invade could reside on subdomain 8, resulting in non-neighboring domain communication. Running this more complicated case further tests the robustness of the new IP method.

Figure 14B:
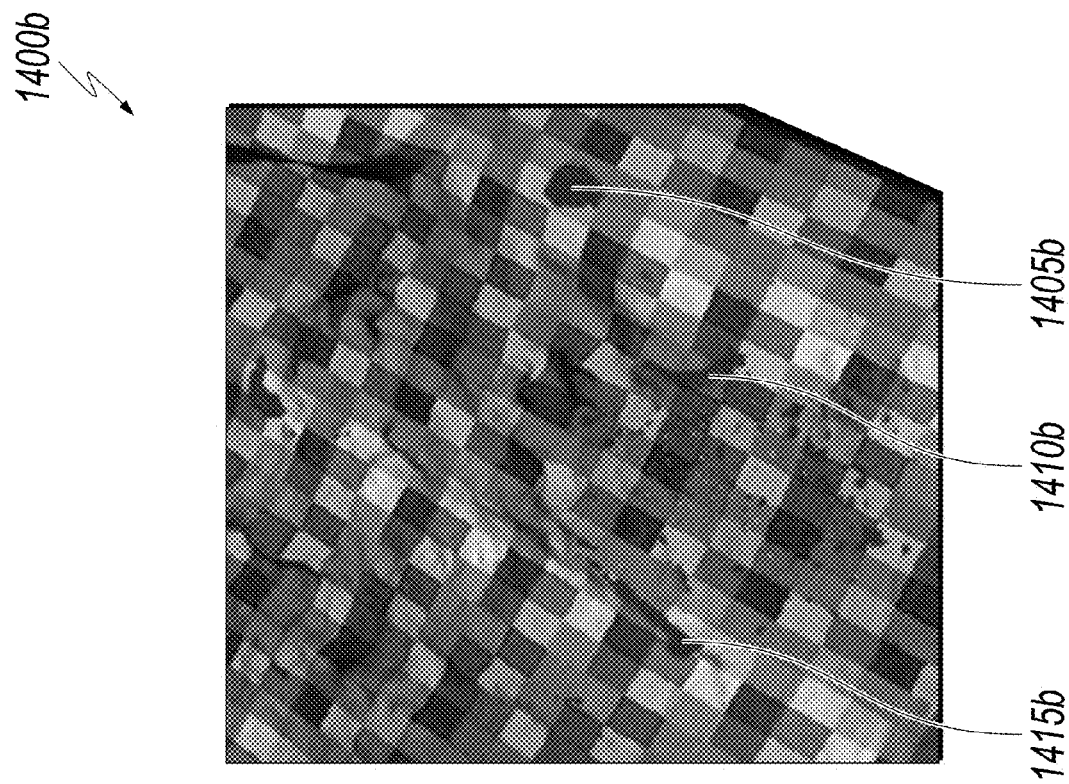
FIG. 14B is a plot illustrating results of running the Test Case 2a model on 1,000 computing cores, according to an implementation.
Figure 14A:
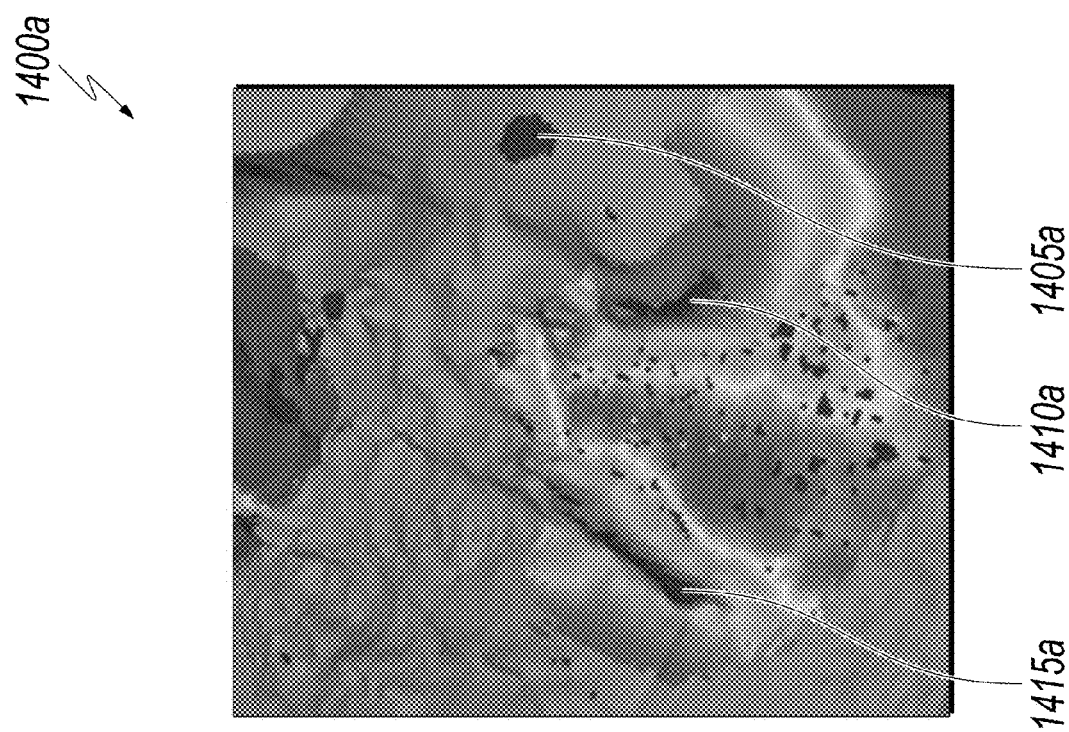
FIG. 14A is a plot illustrating results of running the Test Case 2a model on a single computing core, according to an implementation.

Turning to FIG. 14A, FIG. 14A is a plot 1400a illustrating results of running the Test Case 2a model on a single computing core, according to an implementation. Note dark green patches representing accumulation bodies (for example, 1405a, 1410a, and 1415a) generated from the migration processing.

Turning to FIG. 14B, FIG. 14B is a plot 1400b illustrating results of running the Test Case 2a model on 1,000 computing cores, according to an implementation. The illustrated of FIG. 14B further validate the new IP method. For example, example dark green patches 1405b, 1410b, and 1415b are accumulation bodies generated from the migration processing that should be invariant with respect to the number of computing cores used to run the simulation. As illustrated, example, accumulation bodies 1405b, 1410b, and 1415b (generated using 1000 computing cores) correspond with accumulation bodies 1405a, 1410a, and 1415a of FIG. 14A (generated using a single computing core).

Test Case 2b: Fine-Grid Model

To illustrate that the method can be used to run ultra-large high-resolution basin models, Test Case 2b was refined to a grid size of 4,273 grid cells in the x-direction and 4,033 grid cells in the y-direction with 82 stratigraphic layers, resulting in a model of size 1,413,106,738 grid cells. All other characteristics of the model were kept the same and the model run on 1,000 computing cores using 14 processors per computing node.

Figure 15:
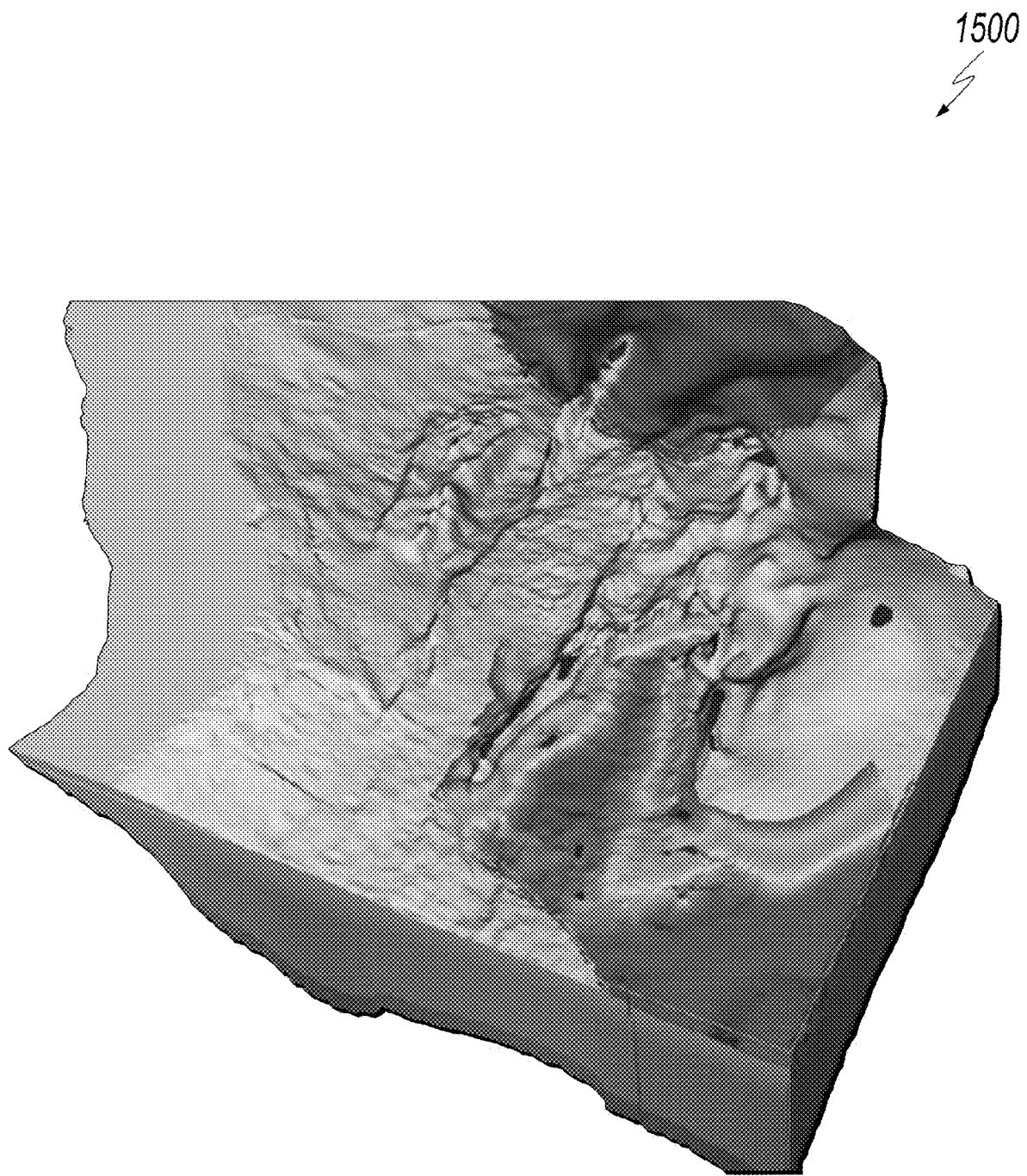
FIG. 15 is a plot illustrating results of running the Test Case 2b model using 1,000 computing cores, according to an implementation.

Turning to FIG. 15, FIG. 15 is a plot 1500 illustrating results of running a model for Test Case 2b using 1,000 computing cores, according to an implementation. As can be seen, the indicated trap locations are comparable to the coarse grid Test Case 2a model (FIG. 14B). However, many of the smaller indicated traps which were suspected to be artifacts due to the low-resolution coarse-grid in Test Case 2a have disappeared in Test Case 2b. In an implementation, the parallel simulation processing time for Test Case 2b is 13 hours of actual time (that is, wall time) for the model for Test Case 2b (for example, containing a billion cells). In comparison, the model for Test Case 2b is too large for a conventional serial IP method which typically uses model sizes of ten million to fifty million cells). Attempting to use a conventional serial IP method with the model for Test Case 2b would take many multiples (for example, 5-10) of the wall time of Test Case 2b processing using parallel simulation processing.

Scalability of Test Case 1 and Test Cases 2a/2b

The reported scalability results were for simulation runs using a LINUX PC cluster connected with QLOGIC INFINIBAND interconnect from QLogic Corporation of Aliso Viejo, Calif., USA. Each computing node in the cluster was configured with 2 XEON ES-2680 CPUs from Intel Corporation of Santa Clara, Calif., USA, running at a clock speed of 2.80 GHz, and each CPU has 10 computing cores. Both test cases were run using 16 processors per computing node.

Figure 16:
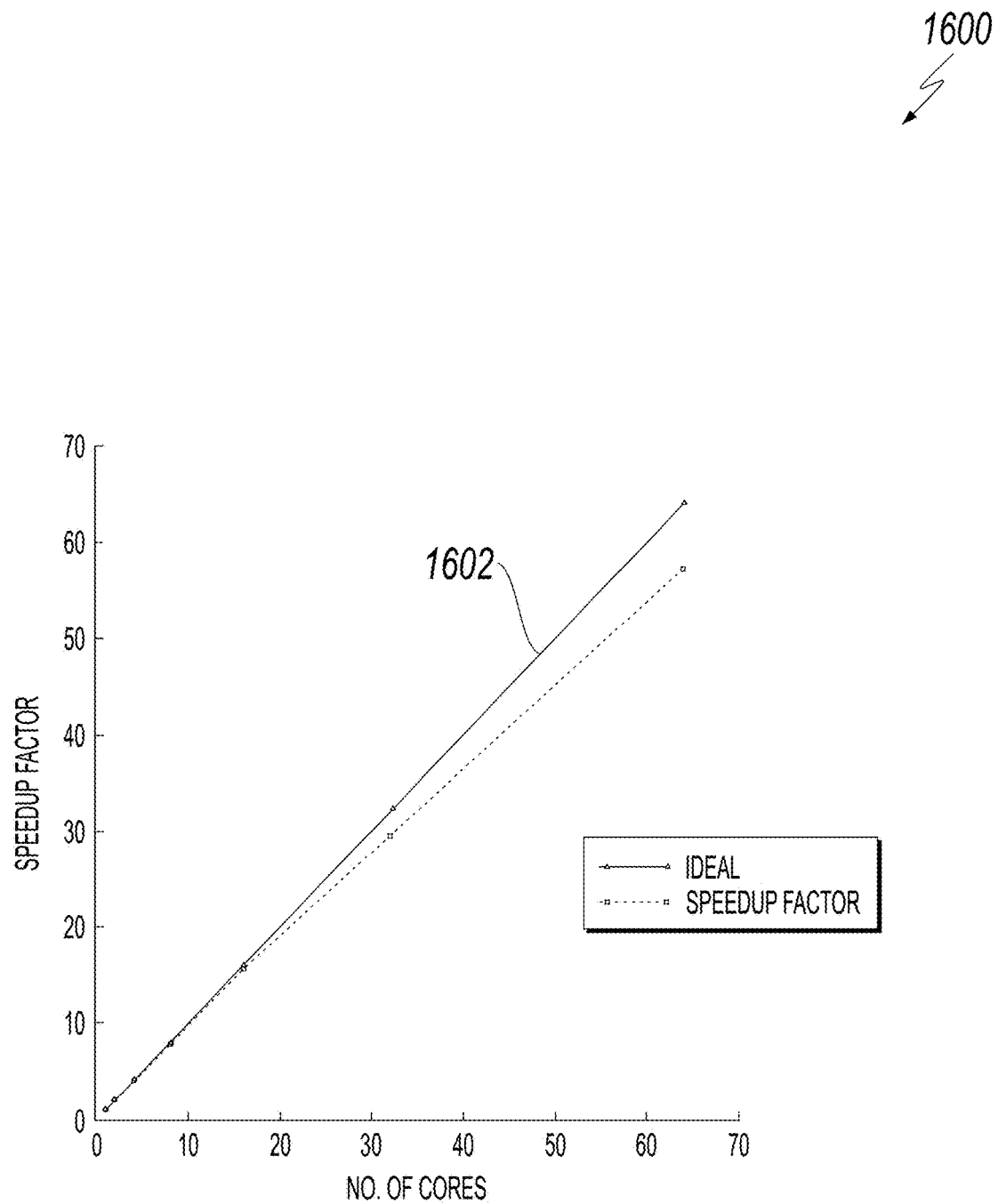
FIG. 16 is a graph of a normalized run time against a number of computing cores plotted for Test Case 1, according to an implementation.
Figure 17:
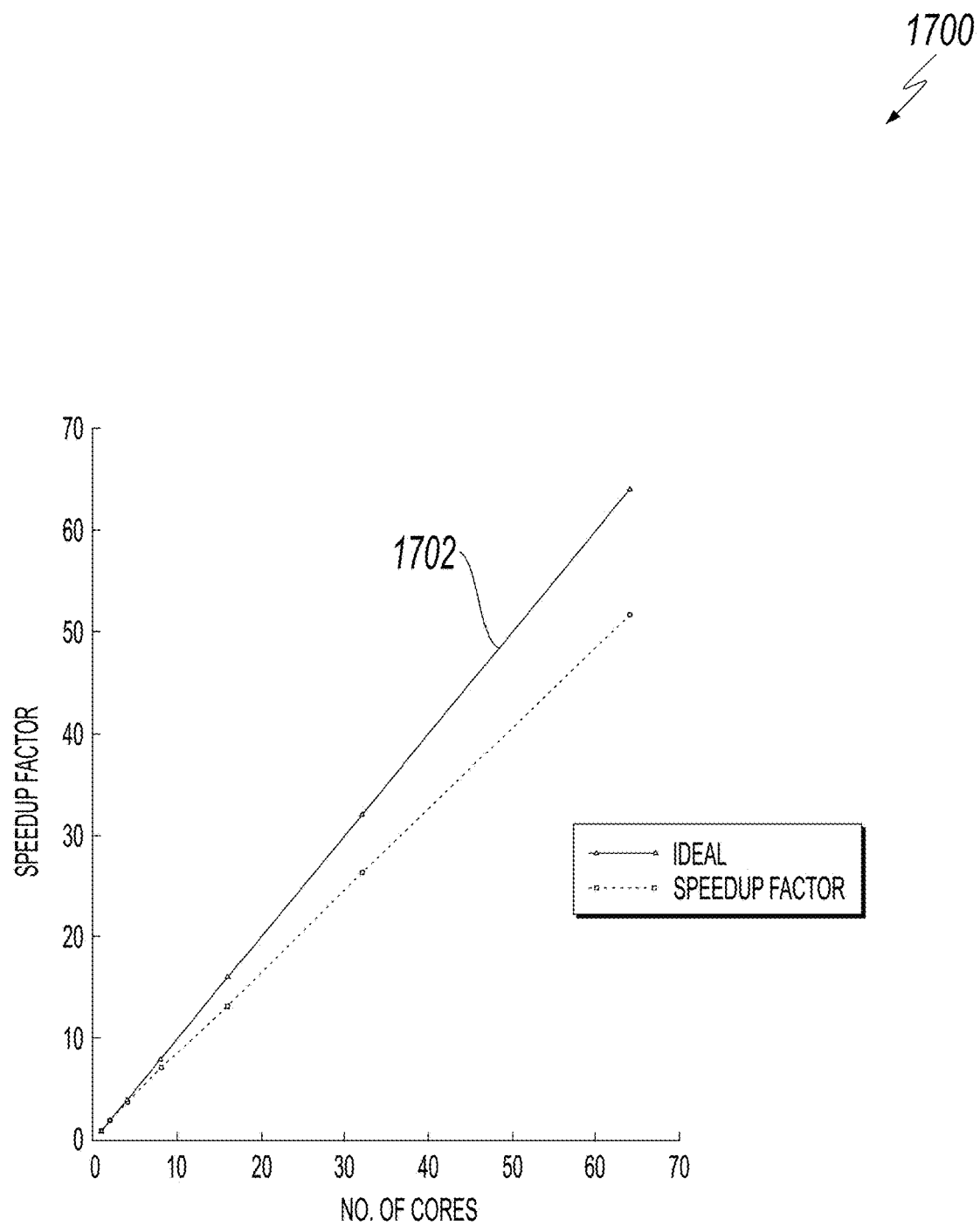
FIG. 17 is a graph of a normalized run time against a number of computing cores plotted for Test Cases 2a/2b, according to an implementation.

Turning to FIG. 16, FIG. 16 is a graph 1600 of a normalized run time against a number of computing cores plotted for Test Case 1, according to an implementation. Similarly, turning to FIG. 17, FIG. 17 is a graph 1700 of a normalized run time against a number of computing cores plotted for Test Cases 2a/2b, according to an implementation. The results illustrated in FIGS. 16-17 indicate that the parallelized new IP method is in fact very scalable. Note that ideal lines 1602 and 1702 of graphs 1600 and 1700, respectively, represent perfect scalability. That is, when using 10 cores of a computer versus 1 core, ideally, the code is expected to run 10-times faster, if there is no parallelization overhead and the computer has no processing bottleneck. In practice, the actual speedup factor is usually less than ideal. The graphs 1600 and 1700 illustrate that the described approach is reaching a speedup factor of about 57 of 64 (graph 1600) and about 51 of 64 in FIG. 17. This demonstrates parallel efficiency of the method in a real case, but the achieved scalability will also depend on distributions of excess HC and the resulting accumulation bodies in the actual model.

Figure 18:
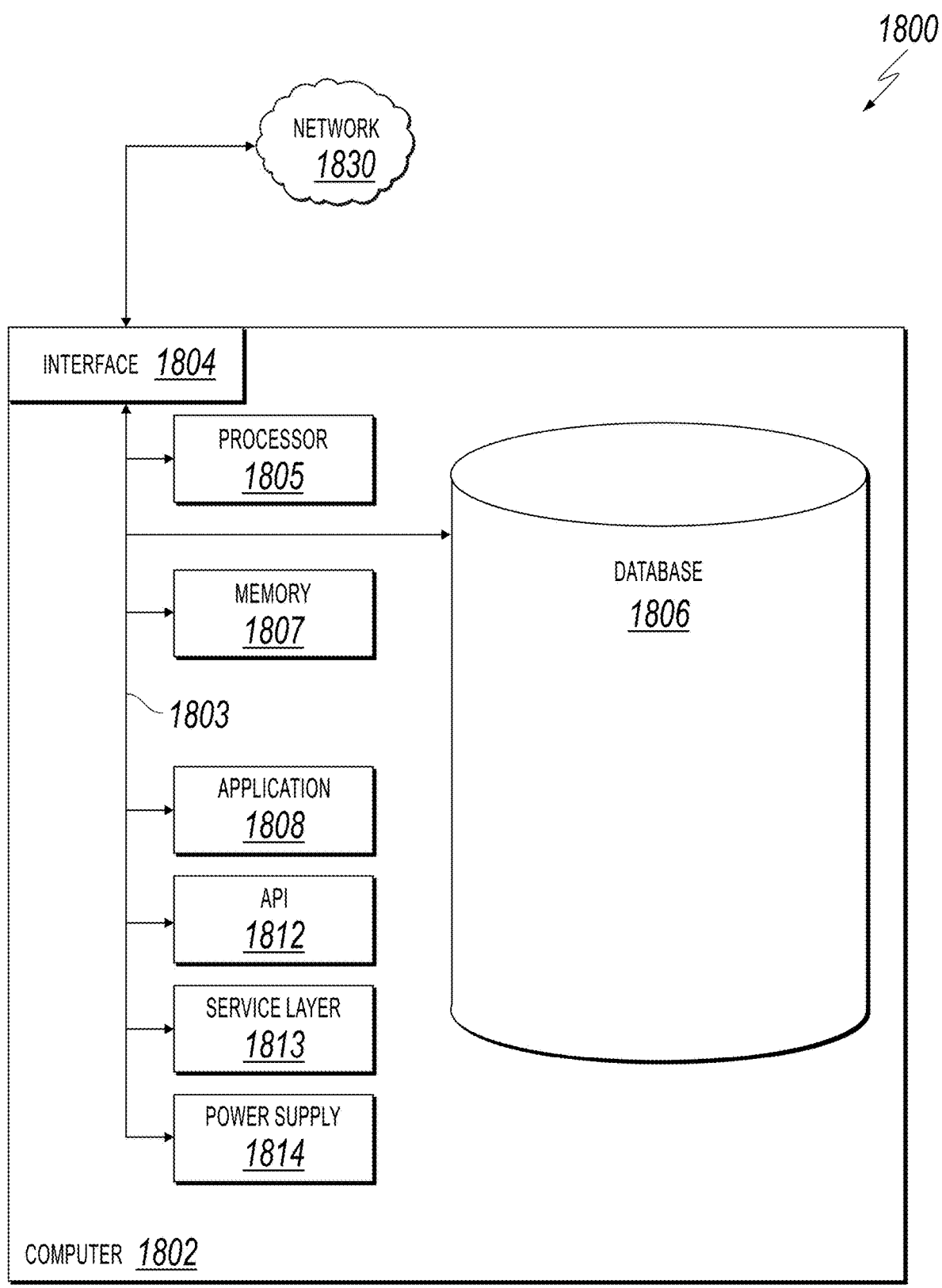
FIG. 18 is a block diagram illustrating an example computer system used to provide computational functionalities associated with described algorithms, methods, functions, processes, flows, and procedures as described in the instant disclosure, according to an implementation.

FIG. 18 is a block diagram of an example computer system 1800 used to provide computational functionalities associated with described algorithms, methods, functions, processes, flows, and procedures, as described in the instant disclosure, according to an implementation. The illustrated computer 1802 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1802 may comprise a computer that includes an input device, such as a keypad, keyboard, touch screen, or other device that can accept user information, and an output device that conveys information associated with the operation of the computer 1802, including digital data, visual, or audio information (or a combination of information), or a graphical user interface (GUI).

The computer 1802 can serve in a role as a client, network component, a server, a database or other persistency, or any other component (or a combination of roles) of a computer system for performing the subject matter described in the instant disclosure. The illustrated computer 1802 is communicably coupled with a network 1830. In some implementations, one or more components of the computer 1802 may be configured to operate within environments, including cloud-computing-based, local, global, or other environment (or a combination of environments).

At a high-level, the computer 1802 is an electronic computing device operable to receive, transmit, process, store, or manage data and information associated with the described subject matter. According to some implementations, the computer 1802 may also include or be communicably coupled with an application server, e-mail server, web server, caching server, streaming data server, or other server (or a combination of servers).

The computer 1802 can receive requests over network 1830 from a client application (for example, executing on another computer 1802) and respond to the received requests by processing the received requests using an appropriate software application(s). In addition, requests may also be sent to the computer 1802 from internal users (for example, from a command console or by other appropriate access method), external or third-parties, other automated applications, as well as any other appropriate entities, individuals, systems, or computers.

Each of the components of the computer 1802 can communicate using a system bus 1803. In some implementations, any or all of the components of the computer 1802, hardware or software (or a combination of both hardware and software), may interface with each other or the interface 1804 (or a combination of both), over the system bus 1803 using an application programming interface (API) 1812 or a service layer 1813 (or a combination of the API 1812 and service layer 1813). The API 1812 may include specifications for routines, data structures, and object classes. The API 1812 may be either computer-language independent or dependent and refer to a complete interface, a single function, or even a set of APIs. The service layer 1813 provides software services to the computer 1802 or other components (whether or not illustrated) that are communicably coupled to the computer 1802. The functionality of the computer 1802 may be accessible for all service consumers using this service layer. Software services, such as those provided by the service layer 1813, provide reusable, defined functionalities through a defined interface. For example, the interface may be software written in JAVA, C++, or other suitable language providing data in extensible markup language (XML) format or other suitable format. While illustrated as an integrated component of the computer 1802, alternative implementations may illustrate the API 1812 or the service layer 1813 as stand-alone components in relation to other components of the computer 1802 or other components (whether or not illustrated) that are communicably coupled to the computer 1802. Moreover, any or all parts of the API 1812 or the service layer 1813 may be implemented as child or sub-modules of another software module, enterprise application, or hardware module without departing from the scope of this disclosure.

The computer 1802 includes an interface 1804. Although illustrated as a single interface 1804 in FIG. 18, two or more interfaces 1804 may be used according to particular needs, desires, or particular implementations of the computer 1802. The interface 1804 is used by the computer 1802 for communicating with other systems that are connected to the network 1830 (whether illustrated or not) in a distributed environment. Generally, the interface 1804 comprises logic encoded in software or hardware (or a combination of software and hardware) and is operable to communicate with the network 1830. More specifically, the interface 1804 may comprise software supporting one or more communication protocols associated with communications such that the network 1830 or interface's hardware is operable to communicate physical signals within and outside of the illustrated computer 1802.

The computer 1802 includes a processor 1805. Although illustrated as a single processor 1805 in FIG. 18, two or more processors may be used according to particular needs, desires, or particular implementations of the computer 1802. Generally, the processor 1805 executes instructions and manipulates data to perform the operations of the computer 1802 and any algorithms, methods, functions, processes, flows, and procedures as described in the instant disclosure.

The computer 1802 also includes a database 1806 that can hold data for the computer 1802 or other components (or a combination of both) that can be connected to the network 1830 (whether illustrated or not). For example, database 1806 can be an in-memory, conventional, or other type of database storing data consistent with this disclosure. In some implementations, database 1806 can be a combination of two or more different database types (for example, a hybrid in-memory and conventional database) according to particular needs, desires, or particular implementations of the computer 1802 and the described functionality. Although illustrated as a single database 1806 in FIG. 18, two or more databases (of the same or combination of types) can be used according to particular needs, desires, or particular implementations of the computer 1802 and the described functionality. While database 1806 is illustrated as an integral component of the computer 1802, in alternative implementations, database 1806 can be external to the computer 1802.

The computer 1802 also includes a memory 1807 that can hold data for the computer 1802 or other components (or a combination of both) that can be connected to the network 1830 (whether illustrated or not). For example, memory 1807 can be random access memory (RAM), read-only memory (ROM), optical, magnetic, and the like, storing data consistent with this disclosure. In some implementations, memory 1807 can be a combination of two or more different types of memory (for example, a combination of RAM and magnetic storage) according to particular needs, desires, or particular implementations of the computer 1802 and the described functionality. Although illustrated as a single memory 1807 in FIG. 18, two or more memories 1807 (of the same or combination of types) can be used according to particular needs, desires, or particular implementations of the computer 1802 and the described functionality. While memory 1807 is illustrated as an integral component of the computer 1802, in alternative implementations, memory 1807 can be external to the computer 1802.

The application 1808 is an algorithmic software engine providing functionality according to particular needs, desires, or particular implementations of the computer 1802, particularly with respect to functionality described in this disclosure. For example, application 1808 can serve as one or more components, modules, or applications. Further, although illustrated as a single application 1808, the application 1808 may be implemented as multiple applications 1808 on the computer 1802. In addition, although illustrated as integral to the computer 1802, in alternative implementations, the application 1808 can be external to the computer 1802.

The computer 1802 can also include a power supply 1814. The power supply 1814 can include a rechargeable or non-rechargeable battery that can be configured to be either user- or non-user-replaceable. In some implementations, the power supply 1814 can include power-conversion or management circuits (including recharging, standby, or other power management functionality). In some implementations, the power-supply 1814 can include a power plug to allow the computer 1802 to be plugged into a wall socket or other power source to, for example, power the computer 1802 or recharge a rechargeable battery.

There may be any number of computers 1802 associated with, or external to, a computer system containing computer 1802, each computer 1802 communicating over network 1830. Further, the term "client," "user," and other appropriate terminology may be used interchangeably, as appropriate, without departing from the scope of this disclosure. Moreover, this disclosure contemplates that many users may use one computer 1802, or that one user may use multiple computers 1802.

In some implementations, the described methodology can be configured to send messages, instructions, or other communications to a computer-implemented controller, database, or other computer-implemented system to dynamically initiate control of, control, or cause another computer-implemented system to perform a computer-implemented or other function/operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI (for example, FIGS. 8-13, 14A-14B, and 15-17) can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, shut down/activate a computing system, cause a network interface device to disable, throttle, or increase data bandwidth allowed across a network connection, or sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementation, the output of the described methodology can be used to dynamically influence, direct, control, influence, or manage tangible, real-world equipment related to hydrocarbon production, analysis, and recovery or for other purposes consistent with this disclosure. For example, real-time data received from an ongoing drilling operation can be incorporated into an analysis performed using the described methodology. Output of the described parallel-processing invasion percolation (IP) migration method for a two-phase oil-water system, can be used for various purposes. For example, depending on a generated result(s) of the described methodology, a wellbore trajectory can be modified, a drill speed can be increased or reduced, a drill can be stopped, an alarm can be activated/deactivated (such as, visual, auditory, or voice alarms), refinery or pumping operations can be affected (for example, stopped, restarted, accelerated, or reduced). Other examples can include alerting geo-steering and directional drilling staff based on detected HC traps (such as, with a visual, auditory, or voice alarm). In some implementations, the described methodology can be integrated as part of a dynamic computer-implemented control system to control, influence, or use with any hydrocarbon-related or other tangible, real-world equipment consistent with this disclosure.

Described implementations of the subject matter can include one or more features, alone or in combination.

For example, in a first implementation, a computer-implemented, parallel-processing method for simulating hydrocarbon (HC) migration in a subsurface medium, comprising: determining that HC has been expelled in source rocks associated with a plurality of grid cells divided into one or more subdomains; identifying potential trap peaks within the plurality of grid cells; performing an invasion process until the HC stops migrating within the plurality of grid cells; determining whether grid cells containing HCs contain an excess volume of HCs; performing an accumulation process to model filling of grid cells with the HC arriving at a trap associated with the identified potential trap peaks; and updating the trap with an HC potential value.

The foregoing and other described implementations can each, optionally, include one or more of the following features:

A first feature, combinable with any of the following features, wherein, to identify the potential trap peaks, an absolute oil phase potential value for each cell is checked to determine each particular grid cell having all neighboring grid cells with a greater potential value than the particular grid cell.

A second feature, combinable with any of the previous or following features, further comprising: determining that a spill point has been reached; and returning to perform the invasion process.

A third feature, combinable with any of the previous or following features, wherein the invasion process comprises: determining that the HC has reached a subdomain boundary; migrating the HC to a neighboring subdomain; and if the HC reached a full trap on a same subdomain, merging the HC with the full trap.

A fourth feature, combinable with any of the previous or following features, further comprising: communicating HC volumes at the subdomain boundaries; and merging the HC across a subdomain boundary with a trap associated with another subdomain.

A fifth feature, combinable with any of the previous or following features, further comprising: determining that the HC has reached a subdomain boundary; and transmitting HC volume, grid cell index of a grid cell with the least oil potential value, and a boundary grid cell list to a neighboring subdomain associated with the subdomain boundary.

A sixth feature, combinable with any of the previous or following features, further comprising: determining that the HC has reached a trap boundary; and determining whether multiple traps share an accumulation boundary.

In a second implementation, a non-transitory, computer-readable medium storing one or more instructions of a computer-implemented, parallel-processing method for simulating hydrocarbon (HC) migration in a subsurface medium, the one or more instructions executable by a computer system to perform operations comprising: determining that HC has been expelled in source rocks associated with a plurality of grid cells divided into one or more subdomains; identifying potential trap peaks within the plurality of grid cells; performing an invasion process until the HC stops migrating within the plurality of grid cells; determining whether grid cells containing HCs contain an excess volume of HCs; performing an accumulation process to model filling of grid cells with the HC arriving at a trap associated with the identified potential trap peaks; and updating the trap with an HC potential value.

The foregoing and other described implementations can each, optionally, include one or more of the following features:

A first feature, combinable with any of the following features, wherein, to identify the potential trap peaks, an absolute oil phase potential value for each cell is checked to determine each particular grid cell having all neighboring grid cells with a greater potential value than the particular grid cell.

A second feature, combinable with any of the previous or following features, further comprising one or more instructions to: determine that a spill point has been reached; and return to perform the invasion process.

A third feature, combinable with any of the previous or following features, wherein the invasion process comprises one or more instructions to: determine that the HC has reached a subdomain boundary; migrate the HC to a neighboring subdomain; and if the HC reached a full trap on a same subdomain, merge the HC with the full trap.

A fourth feature, combinable with any of the previous or following features, further comprising one or more instructions to: communicate HC volumes at the subdomain boundaries; and merge the HC across a subdomain boundary with a trap associated with another subdomain.

A fifth feature, combinable with any of the previous or following features, further comprising one or more instructions to: determine that the HC has reached a subdomain boundary; and transmit HC volume, grid cell index of a grid cell with the least oil potential value, and a boundary grid cell list to a neighboring subdomain associated with the subdomain boundary.

A sixth feature, combinable with any of the previous or following features, further comprising one or more instructions to: determine that the HC has reached a trap boundary; and determine whether multiple traps share an accumulation boundary.

In a third implementation, a computer-implemented, parallel-processing system for simulating hydrocarbon (HC) migration in a subsurface medium, the parallel processing system comprising: determining that HC has been expelled in source rocks associated with a plurality of grid cells divided into one or more subdomains; identifying potential trap peaks within the plurality of grid cells; performing an invasion process until the HC stops migrating within the plurality of grid cells; determining whether grid cells containing HCs contain an excess volume of HCs; performing an accumulation process to model filling of grid cells with the HC arriving at a trap associated with the identified potential trap peaks; and updating the trap with an HC potential value.

The foregoing and other described implementations can each, optionally, include one or more of the following features:

A first feature, combinable with any of the following features, wherein, to identify the potential trap peaks, an absolute oil phase potential value for each cell is checked to determine each particular grid cell having all neighboring grid cells with a greater potential value than the particular grid cell.

A second feature, combinable with any of the previous or following features, further configured to: determine that a spill point has been reached; and return to perform the invasion process.

A third feature, combinable with any of the previous or following features, wherein the invasion process is further configured to: determine that the HC has reached a subdomain boundary; migrate the HC to a neighboring subdomain; and if the HC reached a full trap on a same subdomain, merge the HC with the full trap.

A fourth feature, combinable with any of the previous or following features, further configured to: communicate HC volumes at the subdomain boundaries; and merge the HC across a subdomain boundary with a trap associated with another subdomain.

A fifth feature, combinable with any of the previous or following features, further configured to: determine that the HC has reached a subdomain boundary; and transmit HC volume, grid cell index of a grid cell with the least oil potential value, and a boundary grid cell list to a neighboring subdomain associated with the subdomain boundary.

A sixth feature, combinable with any of the previous or following features, further configured to: determine that the HC has reached a trap boundary; and determine whether multiple traps share an accumulation boundary.

In a computer-implemented, parallel-processing method, a simulation of hydrocarbon (HC) migration in a subsurface medium is performed with a basin simulator. The, basin domain may be partitioned into a plurality of subdomains, each subdomain representing a subset of the basin volume and being organized into a group of grid cells having data regarding HC fluids. The basin simulation is performed in a cluster computer formed of at least one master node being assigned a subdomain of the partitioned basin. Fluid characteristics parameters of interest for the grid cells are simulated. The computer-implemented method also includes: determining that hydrocarbons (HCs) have been expelled in source rocks associated with a plurality of grid cells divided into one or more subdomains; identifying potential trap peaks within the plurality of grid cells; performing an invasion process until the HC stops migrating within the plurality of grid cells; determining whether grid cells containing HCs contain an excess volume of HCs; performing an accumulation process to model filling of grid cells with the HC at a trap associated with the identified potential trap peaks; and updating the trap with an HC potential value.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:
1. A computer-implemented, parallel-processing method for simulating hydrocarbon (HC) migration in a subsurface medium, comprising:
  determining that HC has been expelled in source rocks associated with a plurality of grid cells divided into one or more subdomains;

identifying potential trap peaks within the plurality of grid cells, wherein, to identify the potential trap peaks, an absolute oil phase potential value for each cell is checked to determine each particular grid cell having all neighboring grid cells with a greater potential value than the particular grid cell;

performing an invasion process until the HC stops migrating within the plurality of grid cells;

determining whether grid cells containing HCs contain an excess volume of HCs;

performing an accumulation process to model filling of grid cells with the HC at a trap associated with the identified potential trap peaks; and updating the trap with an HC potential value.

2. The computer-implemented, parallel-processing method of claim 1, further comprising:
determining that a spill point has been reached; and
returning to perform the invasion process.

3. The computer-implemented, parallel-processing method of claim 1, wherein the invasion process comprises:
determining that the HC has reached a subdomain boundary;
migrating the HC to a neighboring subdomain; and
if the HC reached a full trap on a same subdomain, merging the HC with the full trap.

4. The computer-implemented, parallel-processing method of claim 1, further comprising:
communicating HC volumes at the subdomain boundaries; and
merging the HC across a subdomain boundary with a trap associated with another subdomain.

5. The computer-implemented, parallel-processing method of claim 1, further comprising:
determining that the HC has reached a subdomain boundary; and
transmitting HC volume, grid cell index of a grid cell with least oil potential value, and a boundary grid cell list to a neighboring subdomain associated with the subdomain boundary.

6. The computer-implemented, parallel-processing method of claim 1, further comprising:
determining that the HC has reached a trap boundary; and
determining whether multiple traps share an accumulation boundary.

7. A non-transitory, computer-readable medium storing one or more instructions of a computer-implemented, parallel-processing method for simulating hydrocarbon (HC) migration in a subsurface medium, the one or more instructions executable by a computer system to perform operations comprising:
determining that HC has been expelled in source rocks associated with a plurality of grid cells divided into one or more subdomains;
identifying potential trap peaks within the plurality of grid cells, wherein, to identify the potential trap peaks, an absolute oil phase potential value for each cell is checked to determine each particular grid cell having all neighboring grid cells with a greater potential value than the particular grid cell;
performing an invasion process until the HC stops migrating within the plurality of grid cells;
determining whether grid cells containing HCs contain an excess volume of HCs;
performing an accumulation process to model filling of grid cells with the HC at a trap associated with the identified potential trap peaks; and
updating the trap with an HC potential value.

8. The non-transitory, computer-readable medium of claim 7, further comprising one or more instructions to:
determine that a spill point has been reached; and
return to perform the invasion process.

9. The non-transitory, computer-readable medium of claim 7, wherein the invasion process comprises one or more instructions to:
determine that the HC has reached a subdomain boundary;
migrate the HC to a neighboring subdomain; and
if the HC reached a full trap on a same subdomain, merge the HC with the full trap.

10. The non-transitory, computer-readable medium of claim 7, further comprising one or more instructions to:
communicate HC volumes at the subdomain boundaries; and
merge the HC across a subdomain boundary with a trap associated with another subdomain.

11. The non-transitory, computer-readable medium of claim 7, further comprising one or more instructions to:
determine that the HC has reached a subdomain boundary; and
transmit HC volume, grid cell index of a grid cell with least oil potential value, and a boundary grid cell list to a neighboring subdomain associated with the subdomain boundary.

12. The non-transitory, computer-readable medium of claim 7, further comprising one or more instructions to:
determine that the HC has reached a trap boundary; and
determine whether multiple traps share an accumulation boundary.

13. A computer-implemented, parallel-processing system for simulating hydrocarbon (HC) migration in a subsurface medium, the parallel processing system comprising:
a computer memory; and
a hardware processor interoperably coupled with the computer memory and configured to perform operations comprising:
determining that HC has been expelled in source rocks associated with a plurality of grid cells divided into one or more subdomains;
identifying potential trap peaks within the plurality of grid cells, wherein to identify the potential trap peaks, an absolute oil phase potential value for each cell is checked to determine each particular grid cell having all neighboring grid cells with a greater potential value than the particular grid cell;
performing an invasion process until the HC stops migrating within the plurality of grid cells;
determining whether grid cells containing HCs contain an excess volume of HCs;
performing an accumulation process to model filling of grid cells with the HC at a trap associated with the identified potential trap peaks; and
updating the trap with an HC potential value.

14. The computer-implemented, parallel-processing system of claim 13, further configured to:
determine that a spill point has been reached; and
return to perform the invasion process.

15. The computer-implemented, parallel-processing system of claim 13, wherein the invasion process is further configured to:
determine that the HC has reached a subdomain boundary;
migrate the HC to a neighboring subdomain; and
if the HC reached a full trap on a same subdomain, merge the HC with the full trap.

16. The computer-implemented, parallel-processing system of claim 13, further configured to:
- communicate HC volumes at the subdomain boundaries; and
- merge the HC across a subdomain boundary with a trap associated with another subdomain.

17. The computer-implemented, parallel-processing system of claim 13, further configured to:
- determine that the HC has reached a subdomain boundary; and
- transmit HC volume, grid cell index of a grid cell with least oil potential value, and a boundary grid cell list to a neighboring subdomain associated with the subdomain boundary.

* * * * *